United States Patent [19]

Wang et al.

[11] Patent Number: 5,167,806
[45] Date of Patent: Dec. 1, 1992

[54] GAS DISSOLVING AND RELEASING LIQUID TREATMENT SYSTEM

[75] Inventors: Lawrence K. Wang, Latham, N.Y.; Lubomyr Kurylko, New Providence, N.J.; Mu H. S. Wang, Latham, N.Y.

[73] Assignee: International Environmental Systems, Inc., Pittsfield, Mass.

[21] Appl. No.: 708,777

[22] Filed: May 29, 1991

Related U.S. Application Data

[63] Continuation-in-part of Ser. No. 547,982, Jul. 3, 1990, Pat. No. 5,049,320.

[51] Int. Cl.⁵ ............ B01F 3/04; C02F 9/00; C02F 11/14; B01D 17/035
[52] U.S. Cl. .................. 210/188; 210/137; 210/194; 210/195.1; 210/197; 210/199; 210/202; 210/205; 210/206; 210/221.252; 210/258; 210/259; 210/260; 210/295; 210/322; 210/525; 210/703; 210/707; 210/804; 210/805; 210/621; 210/622; 210/63; 261/DIG. 75; 261/121.1
[58] Field of Search .............. 261/122, DIG. 75; 210/205, 206, 221.1, 221.2, 87, 90, 95, 105, 188, 172, 258, 259, 260, 195.1, 197, 199, 220, 250, 202, 137, 194, 525, 322, 252, 295

[56] References Cited

U.S. PATENT DOCUMENTS

| | | | |
|---|---|---|---|
| 1,667,265 | 7/1928 | Boving | 261/122 |
| 1,937,434 | 11/1933 | Piatt | 261/122 |
| 1,971,852 | 8/1934 | Goebels | 261/122 |
| 2,746,605 | 5/1956 | Baum | 210/258 |
| 3,118,958 | 1/1964 | White | 261/122 |
| 3,175,687 | 3/1965 | Jones | 210/703 |
| 3,400,818 | 9/1968 | Tarjan | 261/122 |
| 3,775,314 | 11/1973 | Beitzel et al. | 261/122 |
| 3,820,659 | 6/1974 | Parlette | 210/195 |
| 4,002,561 | 1/1977 | Traverse | 210/205 |
| 4,022,696 | 5/1977 | Krofta | 210/520 |
| 4,031,006 | 6/1977 | Ramirez | 210/221.2 |
| 4,215,081 | 7/1980 | Brooks | 261/122 |
| 4,216,085 | 8/1980 | Chittenden | 210/221.2 |
| 4,303,517 | 12/1981 | Love et al. | 210/208 |
| 4,333,829 | 6/1982 | Walther | 261/122 |
| 4,377,485 | 3/1983 | Krofta | 210/704 |
| 4,492,636 | 1/1985 | Burke | 210/706 |
| 4,626,345 | 12/1986 | Krofta | 210/104 |
| 4,673,494 | 6/1987 | Krofta | 210/202 |
| 4,735,709 | 4/1988 | Zipperian | 261/122 |
| 4,838,434 | 6/1989 | Miller et al. | 261/122 |
| 4,931,175 | 6/1990 | Krofta | 210/221.2 |
| 5,049,320 | 9/1991 | Wang et al. | 261/122 |
| 5,064,531 | 11/1991 | Wang et al. | 210/221.2 |
| 5,068,031 | 11/1991 | Wang et al. | 210/221.2 |
| 5,069,783 | 12/1991 | Wang et al. | 210/221.2 |

FOREIGN PATENT DOCUMENTS

| | | | |
|---|---|---|---|
| 2106660 | 9/1971 | Fed. Rep. of Germany | 261/122 |
| 694918 | 7/1953 | United Kingdom | 261/122 |

OTHER PUBLICATIONS

The U.S. Dept. of Commerce, National Technical Information Service (NTIS) Report #PB 83-127704 (1982) by L. K. Wang.
Journal American Water Works Association, Jun. (1982) by M. Krofta & L. K. Wang.

*Primary Examiner*—Stanley S. Silverman
*Assistant Examiner*—Thomas M. Lithgow

[57] ABSTRACT

An improved gas dissolving and releasing liquid treatment system involving the use of multi-stages gas dissolving pressure vessel and the use of a pressurized water release assembly and an open vessel is described. The gas dissolving and releasing liquid treatment system includes a liquid pressure pump, a pressure vessel, a gas injector, an inlet nozzle assembly, a gas compressor, gas regulators, gas flow meters, pressure gauges, a safety valve, a bleed-off point, feeders, pumps, a pressurized water release unit, a liquid flow meter, an open vessel, sludge removal means, and air emission control means. More than one gases introduced at different inlets are dissolved simultaneously and efficiently in the pressure vessel under controlled high pressure and high rotating velocity. The improved liquid treatment system is compact, simple and cost-effective, and is applied to ozonation, chlorination, recarbonation, oxygenation, bio-oxidation, nitrogenation, aeration, and flotation processes. Chemicals and/or microorganisms are dosed to the present invention to facilitate the required chemical and/or biochemical reactions for liquid treatment.

12 Claims, 7 Drawing Sheets

GAS DISSOLVING AND RELEASING LIQUID TREATMENT SYSTEM

This application is a continuation-in-part of Ser. No. 07/547,982, filed Jul. 3, 1990, (U.S. Pat. No. 5049320).

This invention relates to the treatment of contaminated liquid stream, and more particularly to an apparatus for treating water or wastewater using adsorptive bubble spearation technology.

BACKGROUND OF THE INVENTION

1. Field of the Invention

The present invention relates to a method and an apparatus for dissolving gases into liquid phases under high pressure, ranging from 2 to 7 atmospheric pressure, and high rotation velocity (2,500 rpm or higher) in an enclosed pressure vessel, and for subsequently releasing the pressurized liquid into an open vessel in order to generate extremely fine micro bubbles with a diameter less than 80 microns. Conventional bubble separation, recarbonation, aeration, and ozonation technologies have a low efficiency for gas dissolution and require a long retention time, and large reactors. Conventional biological oxidation processes involve the use of coarse air or oxygen bubbles which are inefficient and cause air pollution. The present invention represents a highly efficient alternative to conventional physical-chemical liquid treatment methods such as conventional bubble separation, flotation, recarbonation, aeration, ozonation, chlorination, oxygenation, etc. The present invention is also an alternative to conventional biological oxidation processes, such as conventional activated sludge, trickling filter, rotating biological contactors, biological tower, deep shaft process, biological fluidized bed, etc.

The adsorptive bubble separation process (including dissolved air flotation, dispersed air flotation, froth flotation, etc.) is a very effective technology for solid-liquid separation and has been in use outside the environmental engineering field for more than 50 years. Originally applied in the field of mining engineering, adsorptive bubble separation now provides the means for separation and/or concentration of 95 percent of the world's base metals and other mineral compounds. Recently, the adsorptive bubble separation process has become increasingly important in such diverse applications as the separation of algaes, seeds, or bacteria from biological reactors, removal of ink from repulped paper stock, recovery of wool fat from food processing streams, peas from pea pods, coal from slate, gluten from starch, oils from industrial effluents, and more recently in drinking water, cooling water, wastewater, and sludge treatments.

Adsorptive bubble separation process may be defined as the mass transfer of a solid from the body of a liquid, to the liquid surface by means of bubble attachment. The solids are in dissolved, suspended and/or colloidal forms. The three basic mechanisms involved are bubble formation, bubble attachment and solids separation. In general, the light weight suspended solids, such as fibers, activated sludge, free oil, chemical flocs, fats, etc., can be readily separated by the process in accordance with physical-chemical bubble attachment mechanism. The colloidal solids, soluble organics, soluble inorganics, and surface active substances are separated from the bulk liquid by the bubble separation process after they are converted from colloidal or soluble form into insoluble form (i.e. suspended solids) which can then be floated by bubbles.

Alternatively, the soluble surface active substances can be separated easily by an adsorptive bubble separation process in accordance with surface adsorption phenomena. Nonsurface active suspended solids, colloidal solids, soluble organics and soluble inorganics can all be converted into surface active substances. All surface active substances in either soluble form or insoluble form can be effectively floated by fine gas bubbles. Production of fine gas bubbles for bubble separation is a difficult engineering task. Conventional methods and apparatus for the production of fine bubbles is similar to an inefficient pressure spray can, which requires over 2 minutes of detention time and over 50 psig pressure. A high horsepower gas compressor for gas dissolving is a necessity for the conventional gas dissolving system.

Conventional recarbonation, aeration and ozonation processes all involve the use of inefficient porous plates or gas diffusers for the introduction of carbon dioxide gas, air or ozone gas into an aqueous phase under atmospheric pressure and low liquid gravimetric pressure. Since bubble sizes are big and non-uniform, many gas bubbles are not able to completely dissolve into the aqueous phase and, therefore, wasted in the gas stream. In cases where ozone gas is used, the residual ozone gas in the gas stream may create an air pollution problem.

The present invention is an enclosed highly efficient pressure vessel, which is specifically designed to dissolve air, oxygen, nitrogen, carbon dioxide, ozone, other gases, or combinations thereof into a liquid stream, such as water, under high pressure (2 to 7 atmospheric pressure) and high rotation velocity (over 2,500 rpm). The swirling flow pattern, special nozzles, and porous gas dissolving means combine to achieve 100 percent gas dissolution in liquid and in turn eliminate the problem of a waste gas stream. The detention time needed for gas dissolving is reduced to a few seconds, therefore, the required size of the gas dissolving pressure vessel is significantly reduced. With the new system, a gas compressor becomes a supplemental means for the enhancement of gas dissolving and is no longer absolutely required. The present invention also relates an improved pressurized water release unit. The pressure vessel's effluent is discharged into a tank through the pressurized water release unit which is equipped with a pressure reduction means for successful generation of extremely fine gas bubbles with diameters less than 80 microns in the liquid of an open vessel. Furthermore, the present invention relates newly improved water purification systems and wastewater treatment systems in which the gas dissolving/releasing apparatus is fully utilized, and to which chemicals and/or microorganisms are dosed for chemical or biochemical reactions.

2. Description of the Prior Art

The method of dissolving volumetric gases into the liquid stream through a liquid-gas mixing vessel of porous gas diffusion tubes, nozzles, porous gas diffusion plates, or mechanical mixers is well known in the field of gas transfer. As the gas bubbles are released into the liquid phase through one of the liquid-gas mixing vessels, only a small fraction of gases becomes soluble in the liquid. The remaining large fraction of gases remains in gaseous form and forms large gas bubbles (over 250 microns in diameter) in the liquid because of gas diffusion created by shearing forces under mainly atmospheric pressure.

Accordingly, at a conventional activated sludge sewage treatment plant, the oxygen transfer efficiency from gas phase into liquid phase is less than 50 percent because diffused coarse air bubbles are supplied to the plant's aeration basins.

At a water softening plant, a swarm of diffused coarse carbon dioxide bubbles are supplied to the recarbonation process unit, again under atmospheric pressure, for precipitation of excessive soluble calcium ions, but only a small amount of carbon dioxide bubbles are chemically effective; the remaining carbon dioxide bubbles are wasted into the ambient air. The bubbles cause no short-term problems, but are contributing to undesirable global warming, the so-called greenhouse effect, in the long run.

Ozone gas is an excellent disinfectant as well as an oxidation agent which is commonly introduced into a liquid stream through a diffuser under nearly atmospheric pressure or negative pressure. This is the well known ozonation process. Any excessive ozone gas escaped from the liquid stream due to poor dissolution contributes to air pollution and also represents an unnecessary waste.

Diffused air flotation, dispersed air flotation, froth flotation, and foam separation are all conventional adsorptive bubble separation processes, in which coarse air bubbles (with a diameter much greater than 250 microns) are generated under nearly atmospheric pressure in one of the liquid-gas mixing vessels. A swarm of coarse air bubbles amounting to 400 percent of the liquid's volumetric flow creates turbulence in the liquid stream, and also provides a large air-to-liquid interface area that allows soluble surface active substances to be separated from the original liquid phase and form a foam or froth phase on the liquid surface.

Dissolved air flotation is an innovative adsorptive bubble separation process, in which extremely fine air bubbles (with diameter less than 80 microns) are required for separation of mainly insoluble suspended solids from the original liquid phase into a thickened scum phase on the liquid surface. The ratio of air volume to liquid volume is only about 1 to 3 percent.

In order to facilitate the aeration, recarbonation, ozonation and dissolved air flotation processes, generation of extremely fine gas bubbles is required, and can be effectively done under high pressure (2 to 7 atmospheric pressures) by the present invention.

Prior apparatus for a compressed air operation is described in U.S. Pat. No. 1,677,265 issued Jul. 17, 1928 to Jens Orten Boving, which relates to liquid pumps of the air-lift type, i.e. of the type in which the liquid is raised in an uptake or ascension pipe by means of compressed air admitted to the pipe at or near its lower end. This patent is particularly directed to an air-lift pump using compressed air still in gaseous form, rather than to a pressure vessel for air dissolution as is the case of the present application. However, it is important to illustrate the development of the air compression art leading to the present disclosure.

A prior apparatus for a compressed air operation applicable to aeration of activated sludge in a sewage treatment plant is described in U.S. Pat. No. 1,937,434 issued Nov. 28, 1933 to William M. Piatt. This patent is particularly directed to an improved compressed air diffusion using a liquid-gas mixing vessel of porous gas diffusion tubes and porous gas diffusion plates. Coarse air bubbles form an upward or horizontal swirling pattern in the liquid in an open tank under normal environmental pressure, and total vessel volume is the summation of liquid volume and gas bubble volume. The present invention utilizes a multi-stage pressure vessel for total dissolution of more than one type of gases (not for distribution and generation of air bubbles) under high pressure ranging 2 to 7 atm. The total pressure vessel volume of the present invention is equal to the liquid volume, and there is no gas flow out of the pressure vessel.

Apparatus for stirring up farinaceous materials in receptacles of any kind by compressed air or other compressed gas is shown in U.S. Pat. No. 1,971,852 issued Aug. 28, 1934, to Paul Goebels. This 1934 patent discloses an improved mixing device using both porous plates and porous tubes for mixing of substances in a container under normal atmospheric pressure of 1. The present invention, however, discloses an improved gas dissolution pressure vessel for soluble gas dissolution under high pressure and high rotation velocity, dissolving either compressed gas or noncompressed gas in liquid and eliminating gas bubbles after entering the pressure vessel. The Goebel's patent relates to an apparatus using compressed air or other gases for mixing purposes and the air or other gases becomes gas bubbles after passing through the porous diffusion media.

Still another apparatus for diffusing gases through porous media is shown in U.S. Pat. No. 3,118,958 issued Jan. 21, 1964, to John W. White. Specifically, White's patent relates to an improved apparatus for continuous production of cellular products which incorporates a micro-porous plate through which a gas is passed in uniform and correct amounts into the material to be formed, and the gas remains in gaseous form. The present invention relates to an improved apparatus for continuous complete dissolution of gas into liquid under pressure, and the gas is no longer in gaseous form in the pressure vessel and continuous formation of micro bubbles with a pressurized water release assembly, instead of with porous media.

Still another apparatus for diffusing gases through porous media is shown in U.S. Pat. No. 3,400,818 issued Sep. 10, 1968 to Gusztav Tarjan. This patent discloses a froth flotation cell which is provided a static vortex inducer unit to which is fed a slurry of material to be separated and air to be dispersed therein, under normal environmental pressure forming a swarm of coarse bubbles. The present invention discloses a multi-stage pressure vessel in which more than one gases are dissolved in liquid, forming no bubbles, no foams, and no froths, in the pressure vessel, and also discloses a pressurized water release assembly for formation of micro bubbles by depressurization, not by gas diffusion.

The method and apparatus for mixing ozone with water in an ozonation process is disclosed by Stuart W. Beitzel et al in their U.S. Pat. No. 3,775,314 issued Nov. 27, 1973. Their patent discloses a new technology by which a whirling mass of fluid in a high pressure zone is injected into a body of water to be purified. The body of water has a pressure lower than that in the high pressure zone, thereby creating in the body of water a partial vacuum zone containing water and water vapor. Introducing ozone and/or oxygen gas at a pressure of less than about 15 psi into the partial vacuum zone, causes the formation of bubbles of the gas in the water. The present invention relates a pressure vessel which completely dissolves ozone and/or oxygen in highly pressurized water at 30-100 psi.

Many U.S. Pat. (No. 3,820,659 issued to Parlette in June, 1974; No. 4,022,696 issued to Krofta in May, 1977; No. 4,303,517 issued to Love et al in December, 1981; No. 4,377,485 issued to Krofta in March, 1983; No. 4,626,345 issued to Krofta in December, 1986; and No. 4,673,494 issued to Krofta in June, 1987) disclose water and wastewater treatment apparatus using dissolved air flotation. While the dissolved air flotation process requires extremely fine air bubbles to increase its treatment efficiency, these patents disclose only improved flotation cells without enclosures (i.e. under normal pressure), but do not disclose any enclosed pressure vessel for dissolved air flotation process optimization. The present invention relates an improved apparatus and method for complete dissolution of various gases for specific optimization applications: ozone for ozonation, carbon dioxide for recarbonation, air for both aeration and dissolved air flotation, and oxygen for oxygenation. In each application, the apparatus disclosed in the present invention produces extremely fine gas bubbles with diameters less than 80 microns.

An apparatus for dissolving a gas such as air into a liquid, under normal one atmospheric pressure, utilizing a submerged tube provided with a means for injecting the gas into the lower end thereof and for inletting liquid into the tube at various locations throughout the length thereof is disclosed in U.S. Pat. No. 4,215,081 issued Jul. 29, 1980 to Kirtland H. Brooks. The applications of Brook's patent and of the present invention are both for dissolving gas. However, the Brook's patent relates to a gas dissolving apparatus without any porous tubes or plates, and being operated under normal one atmospheric pressure for partial gas dissolution due to the fact that a majority of gas remains in gaseous form as bubbles. The present invention relates to an improved gas dissolving method and apparatus being operated under 2 to 7 atmospheric pressure for total gas dissolution, without forming gas bubbles in the pressure vessel.

An apparatus for removing foreign matter form the top surface of water, for use with aquaria, which comprises a discharge tube stationarily disposed in the aquarium and having its upper opening rim below the water surface, is disclosed in U.S. Pat. No. 4,333,829 issued Jun. 8, 1982 to Gerhard Walther. Specifically, Walther's patent relates to an apparatus using coarse bubbles generated by porous media for removing foreign matter under normal pressure. The pressure vessel disclosed in the present invention are used to dissolve gas, not under normal pressure and not for coarse bubble generation. The pressurized water release assembly disclosed in the present invention is for depressurization, and generation of extremely fine micro bubbles without the use of any porous media.

Another prior apparatus for froth flotating is described in U.S. Pat. No. 4,735,709 issued Apr. 5, 1988 to Donald E. Zipperian. This patent discloses a froth flotation system for separating a mineral fraction from an aqueous pulp containing a mixture of mineral and particles. It is accomplished by bubbling gas bubbles into the pulp in an open vessel under normal environmental pressure by two different means that diffuse compressed gas through porous micro diffusers for bubble generation and, in turn, for froth generation. The present invention relates to a pressure vessel in which gas is totally dissolved (i.e. not for bubble formation) under high pressure and over 2,500 rpm rotation velocity. Besides, no froth is involved in the present invention.

Still another prior apparatus for froth flotation is described in U.S. Pat. No. 4,838,434 issued Jun. 13, 1989 to Jan P. Miller et al. Their patent also discloses a froth flotation system in which porous plates are used for bubble generation and froth formation under normal environmental pressure, and in which a tangential inlet is wide open for influent flow coming in by gravity. The present invention relates to a pressure vessel for bubble elimination (i.e. total gas dissolution) under extremely high pressure and over 2,500 rpm rotation velocity, and also relates to a pressurized water release assembly, an open vessel, a chemical mixing chamber, sludge removal means, air emission means, feeders, pumps, etc. for liquid treatment.

Theories and principles of oxygenation, ozonation, aeration, gas dispersion and bubbles generation are fully disclosed by Wang (U.S. NTIS No. PB83-127704-AS, Sept., 1982), and Krofta and Wang (Journal American Water Works Association, Vol. 74, No. 6. P. 304–310, June, 1982). The oxygenation and ozonation system disclosed by Wang (U.S. NTIS No. PB83-127704-AS, Sept., 1982) relates to a hyperbaric reactor vessel into which both oxygen and ozone gases are pumped and diffused together through the same porous plate for simultaneous chemical reaction. The hyperbaric reactor vessel is 50 percent full of liquid, and 50 percent full of compressed gases. The gas transfer inside of said hyperbaric reactor vessel is accomplished by a recirculation pump which sprays the liquid into the compressed gas phase. The present invention is an improved oxygenation and ozonation system into which both oxygen and ozone gases are distributed separately into a pressure vessel for chemical reactions. The present inventors' pressure vessel is full of liquid in which gases are soluble. The total dissolution of the gas inside of the pressure vessel is accomplished by the improved nozzle assembly that gives over 2,500 rpm of rotation velocity. In addition, the present invention involves the use of separate means for dissolution of different gases at desired looations for desired chemical reactions. In an improved liquid treatment plant, air, ozone and carbon dioxide gases are dissolved in the present inventors' pressure vessel at different feed locations inside of the pressure vessel for individual chemical reactions; subsequently, the pressure vessel's effluent is discharged into a flotation clarification tank (i.e. an open vessel) through an improved pressurized water release means for generation of extremely fine oxygen, nitrogen, ozone, and carbon dioxide bubbles. For water purification, chemicals are dosed to the present invention for chemical reactions, coagulation, precipitation, flocs formation, clarification, disinfection, corrosion control, etc. For wastewater treatment, both microorganisms and chemicals are dosed to the present invention for nutrient supply, pH adjustment, bio-oxidation, nitrification, denitrification, phosphate removal, etc.

SUMMARY OF THE INVENTION

In accordance with the present invention, an improved liquid treatment method and apparatus for dissolving various gases and having chemical or biochemical reactions in a liquid stream under high pressure and high rotation velocity, releasing the pressurized liquid stream under reduced pressures in stages, and subsequently producing extremely fine bubbles under normal environmental pressure, comprises the following steps, facilities and alterations:

(a) pumping the liquid stream (i.e. water or other liquid solvent) through a gas injector loop and a liquid nozzle assembly into a pressurization/depressurization apparatus, which has liquid inlets, liquid outlets, gas inlets, gas outlets, gas regulators, gas flow meters, pressure gauges, safety valves, a bleed-off point, a porous center gas dissolving tube, a wall-mounted gas dissolving plate assembly, a cylindrical pressure vessel, a pressurized water release assembly, an open tank, air emission control means, and sludge removal means, (b) feeding chemicals and/or microorganisms into said pressurization/depressurization apparatus, (c) feeding uncompressed gas into said gas injector loop, and feeding compressed gases into said pressure vessel, (d) operating said pressure vessel at pressure range of 2 to 7 atm and over 2,500 rpm rotating velocity, to conform to different gases and liquids, (e) dissolving more than one gases simultaneously and efficiently in said pressure vessel under controlled pressure conditions for specific applications: ozonation, oxygenation, nitrogenation, chlorination, aeration, recarbonation (carbonation) and bio-oxidation, (f) releasing the pressurized effluent from the pressure vessel through a pressurized water release assembly into an open vessel under normal environmental pressure for generation of extremely fine gas bubbles with diameters less than 80 microns, for various chemical and biochemical reactions, as well as for flotation of suspended contaminants and chemical flocs, (g) discharging the flotation clarified liquid as the final effluent or to a tertiary treatment unit for further treatment, (h) collecting the floated sludge and the settled sludge by sludge removal means, and (i) collecting waste gases with a vacuum pump and an enclosure over said open vessel, and purifying said waste gases with granular activated carbon filters.

An apparatus of this invention for dissolving a plurality of gases into a pressurized liquid stream by pressurization, releasing the pressurized liquid stream containing supersaturated dissolved gaseous through a pressurized water release assembly by depressurization, and forming micro gas bubbles in the depressurized liquid stream in an open vessel comprises:

(a) an inlet pipe for the influent liquid stream to enter said apparatus, (b) a pump connected to said inlet pipe for forcing said influent liquid stream and/or a recycled effluent, to pass through a gas injector where the first gas is fed by suction under negative pressure, and through a liquid flow measuring means which is also connected to said inlet ppe, (c) an enclosed cylindrical pressure vessel connected to said inlet pipe for receiving the liquid with or without chemicals and microorganisms from said pump, gas injector and liquid flow measuring means for pressurization, being full of liquid, being equipped with a liquid inlet pipe, a liquid outlet pipe, a pressure gauge, a safety valve, a gas bleed-off valve, a plurality of gas inlets for feeding the second and the third gases, support legs, gas flow meters, gas regulators, and being maintained at 2-7 atmospheric pressure and over 2500 rpm liquid rotation velocity for total gas dissolution, (d) a pressurized water release assembly connected to said enclosed cylindrical pressure vessel and positioned inside of an open vessel comprising a pressure reduction valve, an assembly inlet, a horizontal pressurized water distribution pipe with small holes on top, an adjustable half circular hood on the top of said pressurized water distribution pipe, and a channel allowing said liquid to be depressurized in stages and under laminar flow conditions for generation of micro gas bubbles with diameter less than 80 microns in the depressurized liquid, (e) the open vessel receiving the influent liquid stream with or without chemicals/microorganisms, holding the depressurized liquid containing said micro gas bubbles and from said pressurized water release assembly separating the subnatant and the floated scum, (f) an effluent pipe connected to said open vessel for discharging said subnatant as the clarified effluent, of which a portion is recycled as the recycled effluent, (g) sludge removal means over said open vessel for collection of floated scum, and near the bottom of said open vessel for collection of settled sludge, and (h) waste gas collection and purification means comprising a vacuum pump, a granular activated carbon filter and an enclosure over the top of said open vessel, for collection and purification of waste gases.

An improved two-stage chemical-physical process of this invention for removing turbidity, color, calcium hardness, magnesium hardness, dissolved organics, suspended matter and pathogenic microorganisms from a contaminated groundwater or a liquid comprises the following steps, facilities and alterations:

(a) discharging, through an inlet pipe, a portion of the contaminated influent liquid stream into a first-stage chemical mixing chamber for treatment with the first-stage chemicals, then into a first-stage open vessel, (b) pumping the remaining portion of said contaminated influent liquid stream into a first-stage pressure vessel through a first-stage injector where chlorine is dosed for chlorination, (c) maintaining 2 to 7 atmospheric pressure and liquid mixing inside said first-stage pressure vessel where air is fed for aeration and ozone is fed for ozonation.

(d) discharging the effluent from said first-stage pressure vessel into a first-stage open vessel through a first-stage pressurized water release assembly, (e) generating micro gas bubbles with diameters less than 80 microns in said first-stage open vessel where suspended contaminants and chemical flocs are floated to the water surface by micro gas bubbles and are removed as the floated scums, the waste gases are released to the air environment, and heavy settleable matters are collected from the bottom of said first-stage open vessel, (f) feeding carbon dioxide into the clarified effluent from said first-stage open vessel for recarbonation (or carbonation), forming the first-stage carbonated effluent, (g) by-passing a portion of the first-stage carbonated effluent to a filtration unit for filtering when necessary, forming the first-stage filtered effluent, (h) by-passing still another portion of the first-stage carbonated effluent to a second-stage chemical mixing chamber for treatment with the second-stage chemicals, then into a second-stage open vessel, (i) pumping the remaining portion of said carbonated first-stage effluent to a second-stage pressure vessel through a second-stage injector where ozone is again dosed for ozonation, (j) maintaining 2 to 7 atmospheric pressure, and liquid mixing inside said second-stage pressure vessel where air is again dosed for aeration, and additional carbon dioxide is dosed for recarbonation, (k) discharging the effluent from said second-stage pressure vessel into a second-stage open vessel through a second-stage pressurized water release assembly.

(l) generating micro gas bubbles with diameter less than 80 microns in said second-stage open vessel where suspended contaminants and chemical flocs are floated to the water surface by micro gas bubbles and are removed as the floated scums, the waste gases are released to the air environment, and heavy settleable matters are collected from the bottom of said second-stage open vessel, (m) collecting all said waste gases with vacuum pumps and enclosures over said open vessels, and purifying said waste gases with granular activated carbon filters, when required, (n) feeding carbon dioxide into the clarified effluent from said second-stage open vessel for recarbonation (or carbonation) forming the second-stage carbonated effluent, (o) filtering said second-stage carbonated effluent, forming the second-stage filtered effluent, and (p) disinfecting all filtered effluents, forming the product water.

An improved single-stage chemical-physical process of this invention for removing turbidity, color, calcium hardness, magnesium hardness, pathogenic microorganisms, phosphate, dissolved organics, suspended matter, and heavy metals from a contaminated influent liquid stream comprises the following steps, facilities and alterations:

(a) discharging said influent liquid stream by gravity or pumping through an inlet pipe into a chemical mixing chamber where liquid and dry chemicals are dosed for treatment, (b) discharging the effluent of said chemical mixing chamber into an open vessel for clarification, (c) discharging the effluent of a pressure vessel to said open vessel through a pressurized water release assembly, for generating micro gas bubbles with diameter less than 80 microns in said open vessel, (d) removing suspended contaminants and chemical flocs from the liquid in said open vessel by said micro gas bubbles in said open vessel, forming the floated scums, (e) removing said floated scums from the liquid surface, releasing the waste gas from said liquid surface, removing the settled heavy silts form the liquid bottom, and forming the clarified effluent of said open vessel, (f) collecting said waste gases with a vacuum pump and an enclosure over said open vessel and purifying said waste gases with granular activated carbon filters, when required, (g) discharging said clarified effluent from said open vessel to a recarbonation (carbonation) unit using carbon dioxide, forming the carbonated effluent, (h) filtering said carbonated effluent from said recarbonation unit, forming the filtered effluent, (i) disinfecting said filtered effluent, forming the product water, (j) recycling a portion of said product water, or said filtered effluent, or said clarified effluent by pumping to said pressure vessel through an injector where ozone is fed for ozonation, (k) feeding air and additional ozone into said pressure vessel for aeration and ozonation, respectively, (l) maintaining 2 to 7 atmospheric pressure and liquid mixing inside said pressure vessel for gas dissolution and oxidation, (m) further discharging the effluent of said pressure vessel to said open vessel, through said pressurized water release assembly, and completing a cycle, and (n) discharging the remaining product water.

An improved single-stage biochemical process of this invention for removing total suspended solids (TSS), biochemical oxygen demand (BOD), ammonia nitrogen and additional suspended and dissolved contaminants from a contaminated influent liquid stream comprises the following steps, facilities and alterations:

(a) discharging the influent liquid stream, through an inlet pipe, into a chemical mixing chamber where nutrients, make-up microorganisms and chemicals are fed as necessary, forming the pretreated effluent, (b) pumping said pretreated effluent to the gas injectors where oxygen and air are added for preliminary oxygenation and aeration, respectively, and then to a pressure vessel where oxygen and air are added again for further oxygenation and aeration, respectively, (c) maintaining 15,000 to 35,000 mg/l of microorganisms concentration, 2 to 7 atmospheric pressure, liquid mixing and over 40 mg/l dissolved oxygen in said pressure vessel for removal of dissolved organics and nutrients, and production of insoluble microorganisms by biochemical reactions, (d) discharging the effluent from said pressure vessel into an open vessel through a pressurized water release assembly, (e) generating micro gas bubbles with diameters less then 80 microns inside said open vessel, for floating the suspended contaminants and microorganisms from the liquid to the liquid surface, to form the floated scums, (f) removing the floated scums and waste gases from the liquid surface, removing the settled heavy matters from the liquid bottom, and producing the clarified effluent in said open vessel, collecting said waste gases with a vacuum pump and an enclosure over said open vessel, and purifying said waste gases with granular activated carbon filters, when required, (g) collecting said floated sums containing mainly microorganisms from the surface of said open vessel, wasting a portion of said floated scums, and recycling the remaining portion of said floated scums to said pressure vessel through the influent pump and gas injectors, and (h) discharging said clarified effluent from said open vessel as the final plant effluent.

A dual biochemical process of this invention for removing TSS, BOD, ammonia nitrogen and additional suspended and dissolved contaminants from a contaminated influent liquid stream comprises the following:

(a) discharging the influent liquid stream, through an inlet pipe, into a chemical mixing chamber where nutrients, make-up microorganisms and chemicals are fed as needed, forming the pretreated effluent, (b) discharging a portion of said pretreated effluent into a bioreactor to where the floated scum is recycled, and oxygen and air are supplied for generation of coarse oxygen and air bubbles to mix and support 1,500 to 5,000 mg/l of microorganisms for biochemical reactions, (c) discharging the effluent from said bioreactor to an open vessel for clarification, (d) pumping said pretreated effluent to the gas injectors where oxygen and air are added for preliminary oxygenation and aeration, respectively, and then to a pressure vessel where oxygen and air are added again for further oxygenation and aeration, respectively, (e) maintaining 15,000 to 35,000 mg/l of microorganisms concentration, 2 to 7 atmospheric pressure, liquid mixing, and over 40 mg/l dissolved oxygen in said pressure vessel for removal of dissolved organics and nutrients, and production of insoluble microorganisms by biochemical reactions, (f) discharging the effluent from said pressure vessel into an open vessel through a pressurized water release assembly, (g) generating micro gas bubbles with diameters less than 80 microns inside said open vessel, for floating the suspended contaminants and microorganisms from the liquid to the liquid surface, to form the floated scums, (h) removing the floated scums and waste gases from the liquid surface, removing the settled heavy matters from the liquid bottom, and producing the clarified effluent in said open vessel, (i) collecting said waste gases with a vacuum pump and an enclosure over said open vessel, and purifying said waste gases with granular activated carbon filters, when required, (j) collecting said floated scums containing mainly microorganisms from the surface of said open vessel, wasting a portion of said floated scums, and recycling the remaining portion of said floated scums to said pressure vessel through the influent pump and gas injectors, and (k) discharging said clarified effluent from said open vessel as the final plant effluent.

A low-energy biochemical process of this invention for removing TSS, BOD, ammonia nitrogen and additional suspended and dissolved contaminants from a contaminated influent liquid stream comprises the following:

(a) discharging the influent liquid stream, through an inlet pipe into a chemical mixing chamber where nutrients, make-up microorganisms and chemicals are fed as needed, forming the pretreated effluent, (b) discharging said pretreated effluent into a bioreactor to where the floated scum is recycled, and oxygen and air are supplied for generation of coarse oxygen and air bubbles to mix and support 1,500 to 5,000 mg/l of microorganisms for biochemical reactions.

(c) discharging the effluent from said bioreactor to an open vessel having micro gas bubbles for separation of suspended matter including microorganism from the biochemically treated liquid stream, (d) pumping a portion of the clarified final effluent from said open vessel to the gas injectors where oxygen and air are added for preliminary oxygenation and aeration, respectively, and then to a pressure vessel where oxygen and air are added again for further oxygenation and aeration, respectively, (e) maintaining 2 to 7 atmospheric pressure, liquid mixing, and over 15 mg/l dissolved oxygen in said pressure vessel for complete gas dissolution, (f) discharging the effluent from said pressure vessel into said open vessel through a pressurized water release assembly, (g) generating micro gas bubbles with diameters less than 80 microns inside said open vessel, for floating the suspended contaminants and microorganisms from the liquid to the liquid surface, to form the floated scums, (h) removing the floated scums and waste gases from the liquid surface, removing the settled heavy matters from the liquid bottom, and producing the clarified effluent (subnatant) in said open vessel, (i) collecting said waste gases with a vacuum pump and an enclosure over said open vessel, and purifying said waste gases with granular activated carbon filters, when required, (j) collecting said floated scums containing mainly microorganisms from said open vessel, wasting a portion of said floated scums, and recycling the remaining portion of said floated scums to said bioreactor, and (k) discharging said clarified effluent from said open vessel as the final plant effluent.

BRIEF DESCRIPTION OF THE DRAWINGS

The present invention will become more fully understood from the detailed description given hereinbelow and the accompanying drawings which are given by way of illustration, and thus are not limitative of a present invention, and wherein.

DESCRIPTION OF THE PREFERRED EMBODIMENTS

FIG. 1A to FIG. 7 inclusive are a set of schematic diagrams of the present invention: (a) when applied to dissolving gases (solutes, such as air, oxygen, nitrogen, ozone, carbon dioxide, etc.) into a pressurized liquid (a solvent, such as water) in a pressure vessel resulting super-saturated dissolved gas concentrations in said pressurized liquid; (b) when applied to releasing pressurized water through pressure reduction means forming micro gas bubbles in an open vessel; and (c) when applied to liquid treatment giving high treatment efficiency. Many gaseous solutes, liquid solvents and flow patterns can also be applied to the present invention.

Figure 1A:
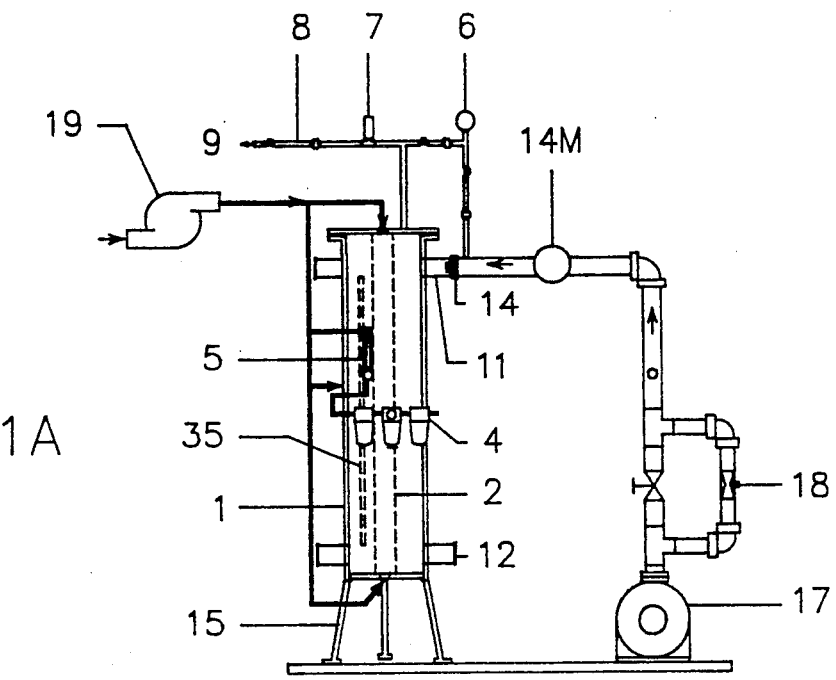
FIG. 1A and FIG. 1B show the side view and the top view, respectively, of the overall gas dissolving system in accordance with the present invention.
Figure 1B:
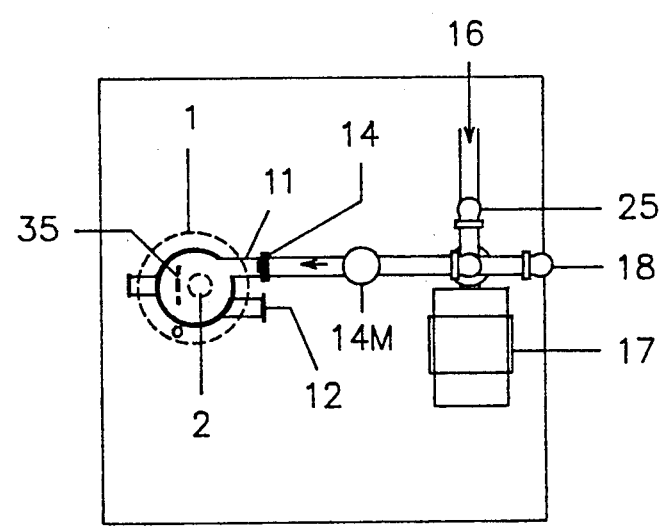

Referring to FIG. 1A and FIG. 1B, the gas dissolving apparatus is equipped with an inlet pipe 8, a pump 17, a gas injector loop 18, a recirculation loop 25, a pressure vessel 1, a gas compressor 19, a gas regulator equipment 4, a gas meter 5, a pressure gauge 6, a safety valve 7, a bleed-off point 9, a liquid inlet section 11, a liquid outlet section 12, multiple gas inlets 13P and 13C, a liquid nozzle assembly 14 and three standing legs 15. The gas inlets 13P and 13C are for the wall-mounted porous gas dissolving plate assembly 35 and the porous gas dissolving tube 2, respectively, inside said pressure vessel 1.

Referring to FIG. 1A and 1B, the liquid stream 16 with or without chemicals or microorganisms is pumped by a pressure pump 17 through a gas injector loop 18, a recirculation loop 25 and a nozzle assembly 14 into the pressure vessel 1, where the gaseous solutes are introduced and are subsequently dissolved into the liquid stream under high pressure 2-7 atm., and a rotation velocity over 2500 rpm. The nozzle assembly 14 is in the inlet pipe 11 which feeds the liquid stream 16 into said pressure vessel 1, and merges tangentially with said pressure vessel causing high rotation velocity. The liquid containing a high concentration of gaseous solutes, is discharged from said pressure vessel 1 from the liquid outlet section 12 to a pressurized water release assembly 40, shown in FIG. 2A, FIG. 2B and FIG. 2C for its front view, side view and top view, respectively.

The gas injector 18 shown in FIG. 1A and FIG. 1B introduces gas into a liquid stream by suction (i.e. negative pressure) before entering the pressure vessel 1.

Figure 2B:
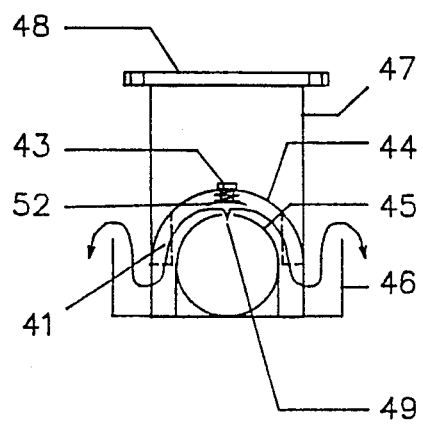
FIGS. 2A, 2B and 2C present the front view, side view and top view, respectively, of a pressurized water release assembly in accordance with the present invention.
Figure 2C:
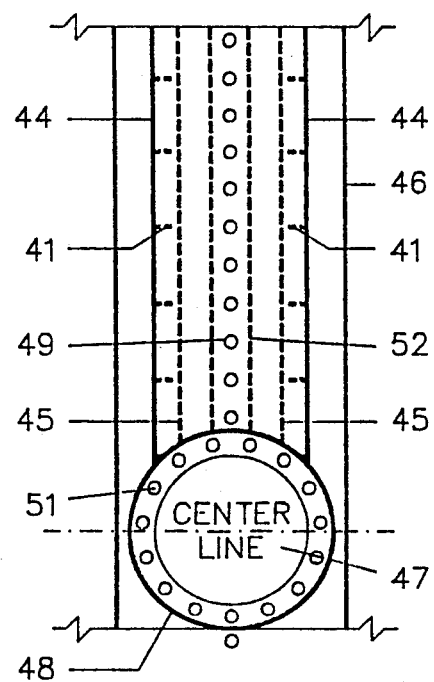
Figure 2A:
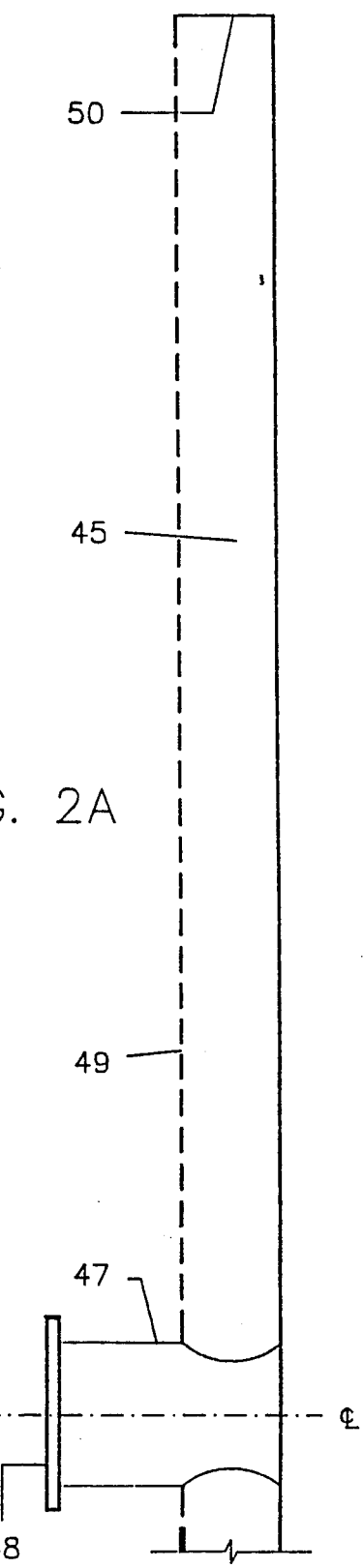

FIGS. 2A, 2B and 2C illustrate the three views of said pressurized water release assembly 40 which receives the effluent from the pressure vessel 1 for pressurized water distribution, pressure reduction and subsequent generation of extremely fine gas bubbles (with diameter less than 80 microns) in the liquid. The effluent from the pressure vessel 1 in FIGS. 3, 4, 5, 6, or 7 comes from the pressure vessel outlet 12, passes through a liquid pressure reduction valve 20 and then flows through the inlet 47 of the pressurized water release assembly 40. As shown in FIGS. 2A, 2B and 2C, the influent to said pressurized water release assembly 40 is then distributed horizontally through the pressurized water distribution pipe 45 and through a series of distribution holes 49. The effluent from the distribution holes 49 travels upward hitting the base plate 52, turns sideways between the hood 44 and the outside surface of the pressurized water distribution pipe 45, and exits at the opening between the distribution channel 46 and the hood 44. As the pressurized water from the pressure vessel 1 goes through the entire pressurized water release assembly 40, the high pressure is gradually reduced, so that extremely fine gas bubbles with diameter less than 80 microns are formed under controlled engineering conditions.

Referring to both FIG. 1A and FIG. 1B, more than one gas can be fed simultaneously into said pressure vessel 1 through gas inlets 13P and 13C and a gas injector loop 18 for a total gas dissolving and chemical reactions in the liquid under 2 to 7 atmospheric pressure.

Since more than one gas can be dissolved simultaneously and efficiently in said pressure vessel 1 under controlled pressure, and rotation velocity, and both chemicals and microorganisms can be dosed to said pressure vessel 1 and an open vessel 63 (see FIG. 3, 4, 5, 6 and 7) for liquid treatment, the improved apparatus is compact, simple and cost-effective, and is applied to ozonation, chlorination, recarbonation, oxygenation, nitrogenation, aeration and flotation processes, which are illustrated by the following examples.

EXAMPLE 1

Figure 3:
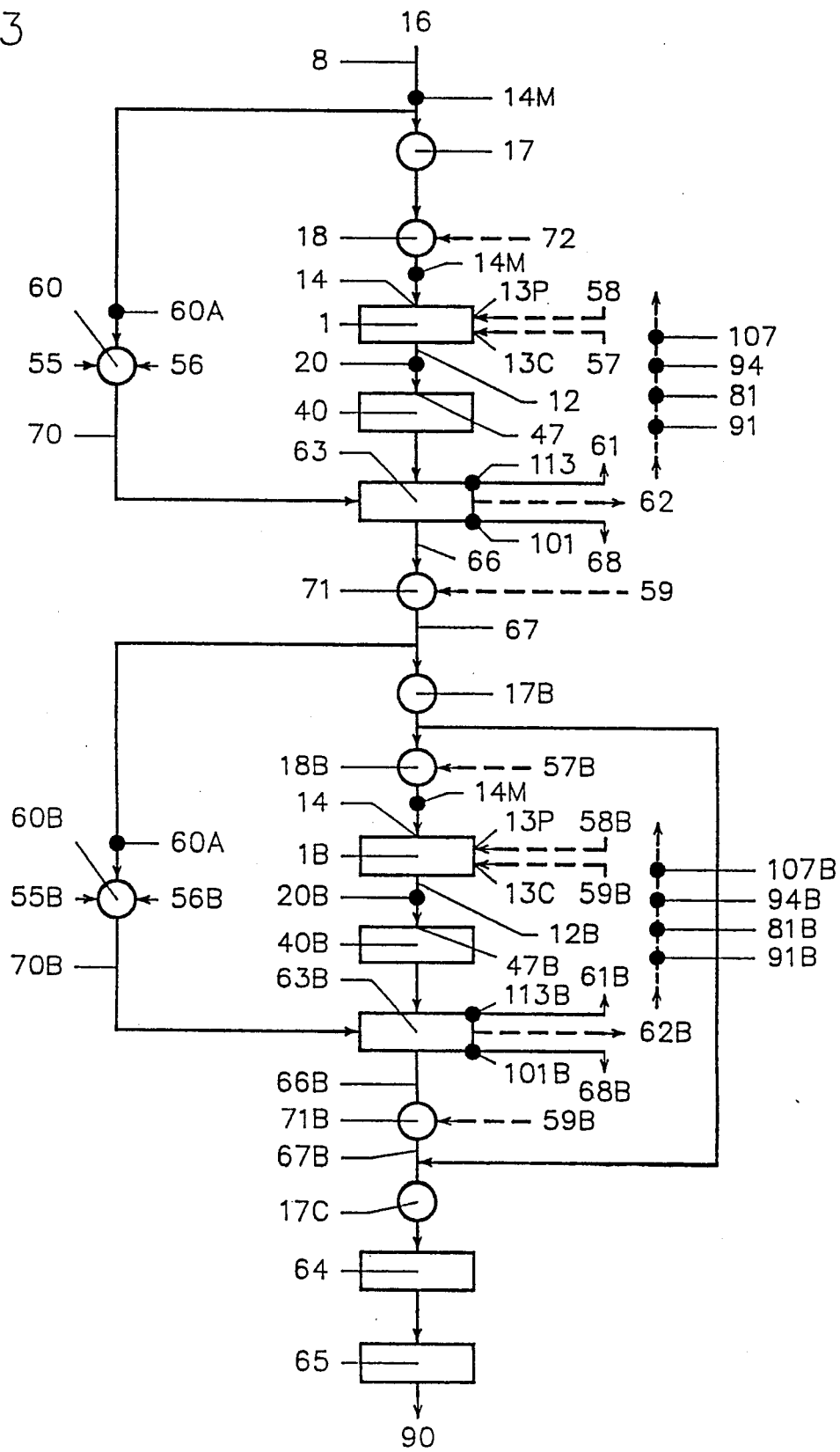
FIG. 3 shows the flow diagram of a two-stage chemical-physical process system (two-stage hydroxide-soda ash flotation softening process system) described in Example 1 for water treatment.

Several batches of groundwater from Massachusetts, USA, having a composition which includes 9.8 mg/l of carbon dioxide, 175 mg/l of calcium hardness as $CaCO_3$, 42 mg/l of magnesium hardness as $CaCO_3$, 120 mg/l of bicarbonate alkalinity as $CaCO_3$, 2 NTU of turbidity, 0.4 mg/l of iron, 0.06 mg/l of manganese, 0.5 mg/l of phosphate as P, 5 CU of color, neutral pH and 3/100 ml of total coliform bacteria have been adequately treated by a two-stage chemical-physical process system shown in FIG. 3. The apparatus used is partially shown in FIGS. 1A, 1B, 2A, 2B and 2C and systematically shown in FIG. 3. After treatment, the quality of product water meets the U.S. Federal and Stage Drinking water Standards. In process operation, the liquid stream 16 is partially pumped by a pressure pump 17 through a gas injection loop 18 where chlorine 72 is dosed by suction. The mixture of chlorine 72 and liquid stream 16 flows through a nozzle assembly 14 and a liquid inlet 11, entering the first-stage pressure vessel 1 wherein compressed air (oxygen and nitrogen) 58 and ozone 57 are fed to said pressure vessel 1 through the gas inlets 13P, and 13C, respectively (see FIG. 3). The unit processes involving the addition of ozone, chlorine and air are termed ozonation, chlorination and aeration, respectively. The ozone 57, chlorine 72 and air 58 gases are dissolved totally in said pressure vessel 1 under high pressure (2-7 atm.) and high rotation velocity (over 2,500 rpm). The effluent from said pressure vessel 1 containing super-saturated gases is released from a liquid outlet 12 into a pressurized water release assembly 40, and is mixed in the first-stage open vessel 63 with the by-passed liquid stream 70 which has been treated with chemicals 55 and 56 in the first-stage mixing chamber 60. Within said the first-stage open vessel 63, the micro gas bubbles with diameter less than 80 microns are formed in said first-stage open vessel 63 for ozonation, chlorination, aeration and flotation. Either ozonation or chlorination is a predisinfection step which kills all pathogenic microorganisms as well as total coliform bacteria.

Soluble divalent ferrous ions (Fe+2) and divalent manganese ions (Mn+2) are oxidized by the oxygen in the air bubbles, resulting trivalent ferric ions (Fe+3) and insoluble manganese dioxide precipitates. Ferric ions reacts with lime 55 as follows:

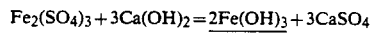
$Fe_2(SO_4)_3 + 3Ca(OH)_2 = \underline{2Fe(OH)_3} + 3CaSO_4$

All chemical compounds with underlines are insoluble precipitates.

Calcium hardness and magnesium hardness in the forms of bicarbonate are precipitated as calcium carbonate or magnesium hydroxide by the addition of lime as chemical 55:

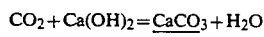
$CO_2 + Ca(OH)_2 = \underline{CaCO_3} + H_2O$

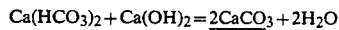
$Ca(HCO_3)_2 + Ca(OH)_2 = \underline{2CaCO_3} + 2H_2O$

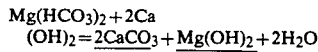
$Mg(HCO_3)_2 + 2Ca(OH)_2 = \underline{2CaCO_3} + \underline{Mg(OH)_2} + 2H_2O$ Noncarbonate magnesium hardness is precipitated as magnesium hydroxide by the addition of lime 55, with the concurrent production of calcium sulfate, which, in turn, is precipitated as calcium carbonate by the addition of sodium carbonate $Na_2CO_3$ or soda-ash 56. The reactions are illustrated as follows:

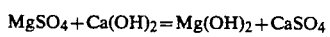
$MgSO_4 + Ca(OH)_2 = \underline{Mg(OH)_2} + CaSO_4$

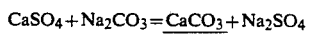
$CaSO_4 + Na_2CO_3 = \underline{CaCO_3} + Na_2SO_4$

The existing noncarbonate calcium hardness is also precipitated by the addition of soda-ash 56 as illustrated by the above.

Alternatively, carbonate and noncarbonate hardness can be removed by the addition of caustic soda or sodium hydroxide NaOH, instead of lime as chemical 55, as illustrated by the following:

$$CO_2 + 2NaOH = Na_2CO_3 + H_2O$$

$$Ca(HCO_3)_2 + 2NaOH = \underline{CaCO_3} + Na_2CO_3 + 2H_2O$$

$$Mg(HCO_3)_2 + 4NaOH = \underline{Mg(OH)_2} + 2Na_2CO_3 + 2H_2O$$

$$MgSO_4 + 2NaOH = \underline{Mg(OH)_2} + Na_2SO_4$$

Now the insoluble magnesium hydroxide $Mg(OH)_2$, calcium carbonate $CaCO_3$, ferric hydroxide $Fe(OH)_3$, and manganese dioxide $MnO_2$ agglomerate together as insoluble chemical flocs in said first-stage open vessel 63 in FIG. 3, and further agglomerate with other colloidal contaminants, such as turbidity, forming bigger flocs to be floated by the micro bubbles released from the pressurized water release assembly 40. The floated sludge 61 is removed by skimming or scooping means 113 from the water surface of said first-stage open vessel 63, where the waste gases 62 from bubbles are also released. Small amount of settled silts 6 is collected from the bottom of said first-stage open vessel 63. The softened water 66 is usually saturated with about 30 mg/l of soluble calcium carbonate at the high pH values ranging 10-11; therefore, the softened water 66 must be stabilized by stabilization 71, with carbon dioxide 59 or acids to be added to the softened water 66 as follows:

$$CaCO_3 + CO_2 + H_2O = Ca(HCO_3)_2$$

$$2CaCO_3 + H_2SO_4 Ca(HCO_3)_2 + CaSO_4$$

$$2CaCO_3 + 2HCl = Ca(HCO_3)_2 + CaCl_2$$

The use of carbon dioxide for stabilization is usually termed "recarbonation" or "carbonation".

After the softened water 66 from said first-stage open vessel 63 is stabilized by stabilization 71, the residual pH is about 8.5. A portion of the stabilized water 67 is by-passed by pump 17B to filtration 64, and disinfection 65 for further treatment, before being discharged as the product water 90. This is the improved single-stage treatment, which is applied to a rectangular single-stage chemical-physical apparatus or a circular single-stage chemical-physical apparatus. Stabilization 71 immediately ahead of the filtration 64 is used to prevent scaling of the filter media by bubbling carbon dioxide 59.

The remaining portion of the stabilized water 67 from said first-stage stabilization 71 is further treated by the second-stage apparatus shown in FIG. 3, involving the additional use of all facilities with "B" designations. The stabilized water 67 is pumped by the pump 17B to the second-stage pressure vessel 1B, the pressurized water release assembly 40B, and an open vessel 63B where the by-passed water 70B containing chemicals 55B and 56B is mixed together, where micro gas bubbles are also formed for flotation, and from where the floated scum 61B are removed by skimming/scooping means 113B, the settled silts 68B are removed by sludge collection means 101B and the mixed gases 62B are escaped.

In the two-stage chemical-physical system shown in FIG. 3, addition of soda ash 56 to the first-stage mixing chamber 60, ozone 57B to the gas injector 18B, and lime 55B to the second-stage mixing chamber 60B are optional and de-emphasized; however, addition of both carbon dioxide 59B and air 58B to said second-stage pressure vessel lB and addition of soda ash 56B to said second-stage mixing chamber 60B are emphasized and enhanced. The softened water 66B from said second-stage open vessel 63B is pumped by the pumps 17B and 17C to the second-stage stabilization 71B (with carbon dioxide 59B or acids, not shown), filtration 64 and disinfection 65 before being discharged as the product water 90. The present invention shown in FIG. 3, is a "Two-Stage Hydroxide-Soda Ash Flotation Softening Process," or simply a "Two-Stage Chemical-Physical Process."

EXAMPLE 2

Several batches of groundwater from Arkansas, USA, have been spiked with heavy metal and phosphate contaminants to have a composition including 10 mg/l of ferrous iron, 0.9 mg/l of divalent manganese, 75 NTU of turbidity, 312 mg/l of total hardness as $CaCO_3$, 420 CU of color, 8 mg/l of phosphate as P, 3/100 ml of total coliforms, 3.5 mg/l of Ni, 0.2 mg/l of Cr, 0.002 mg/l of Hg, 0.2 mg/l of Cd, 1.5 mg/l of Cu, 6.1 mg/l of Zn, 1.2 mg/l of Pb, 0.1 mg/l of Ag, 0.01 mg/l of Se, 0.8 mg/l of Ba, 0.01 mg/l of As, and 6.7 units of pH. The spiked groundwater has been successfully treated by a Single-Stage chemical-physical system, which apparatus is partially shown in FIGS. 1A, 1B, 2A, 2B and 2C and systematically shown in FIG. 4. During treatment, the influent liquid stream 16 is fed by either gravity or pumping to an inlet pipe 8, leading to a chemical mixing chamber 60 where lime 55 ($Ca(OH)_2$ or $CaO$), sodium aluminate 73 ($NaAlO_2$), potassium permanganate 75 ($KMnO_4$) and polymer 74 are added and flocculated at pH about 11. The effluents from said mixing chamber 60 and from the pressurized water release assembly 40 meet in an open vessel 63 where the micro gas bubbles of ozone 57 ($O_3$) and air 58 ($N_2$ and $O_2$) with diameter less than 80 microns are formed.

The following are the chemical reactions occurring in said chemical mixing chamber 60 and said open vessel 63.

$$NaAlO_2 + 2H_2O = NaOH + \underline{Al(OH)_3}$$

$$CO_2 + 2NaOH = Na_2CO_3 + H_2O$$

$$Ca(HCO_3)_2 + 2NaOH = \underline{CaCO_3} + Na_2CO_3 + 2H_2O$$

$$Mg(HCO_3)_2 + 4NaOH = \underline{Mg(OH)_2} + 2Na_2CO_3 + 2H_2O$$

$$MgSO_4 + NaOH = \underline{Mg(OH)_2} + Na_2SO_4$$

$$CaO + H_2O = \underline{Ca(OH)_2}$$

$$CO_2 + Ca(OH)_2 = \underline{CaCO_3} + H_2O$$

$$Ca(HCO_3)_2 + Ca(OH)_2 = \underline{2CaCO_3} + 2H_2O$$

$$Mg(HCO_3)_2 + 2Ca(OH)_2 = \underline{2CaCO_3} + \underline{Mg(OH)_2} + 2H_2O$$

$$MgSO_4 + Ca(OH)_2 = \underline{Mg(OH)_2} + CaSO_4$$

$$CaSO_4 + Na_2CO_3 = \underline{CaCO_3} + Na_2SO_4$$

$$2FeSO_4 + O_3 + Na_2SO_4 + H_2O = Fe_2(SO_4)_3 + O_2 + 2NaOH$$

$$2KMnO_4 + 2FeSO_4 + 2H_2SO_4 = Fe_2(SO_4)_3 + K_2SO_4 +$$

$$2MnO_2 + 2H_2O + O_2$$

-continued $$Fe_2(SO_4)_3 + 6H_2O = \underline{2Fe(OH)_3} + 3H_2SO_4$$

$$2Al(OH)_3 + 3H_2SO_4 = Al_2(SO_4)_3 + 6H_2O$$

$$Al_2(SO_4)_3 + 2Na_3PO_4 = \underline{2AlPO_4} + 3Na_2SO_4$$

$$2O_3 + C(Organics) = CO_2 + 2O_2$$

$$MnSO_4 + O_3 + H_2O = \underline{MnO_2} + O_2 + H_2SO_4$$

$$NiCl_2 + Ca(OH)_2 = \underline{Ni(OH)_2} + CaCl_2$$

$$NiSO_4 + Ca(OH)_2 = \underline{Ni(OH)_2} + CaSO_4$$

$$Cr_2(SO_4)_3 + 3Ca(OH)_2 = \underline{2Cr(OH)_3} + 3CaSO_4$$

$$Cd(NO_3)_2 + Ca(OH)_2 = Ca(NO_3)_2 + \underline{Cd(OH)_2}$$

$$CuSO_4 + Ca(OH)_2 = CaSO_4 + \underline{Cu(OH)_2}$$

$$ZnCl_2 + Ca(OH)_2 = \underline{Zn(OH)_2} + CaCl_2$$

$$Pb(NO_3)_2 + Ca(OH)_2 = Ca(NO_3)_2 + \underline{Pb(OH)_2}$$

$$2AgNO_3 + Ca(OH)_2 = \underline{2Ag(OH)} + Ca(NO_3)_2$$

Specifically sodium aluminate 73 ($NaAlO_2$) produces alum floc $Al(OH)_3$, and sodium hydroxide NaOH, which in turn reacts with calcium hardness $Ca(HCO_3)_2$ and magnesium hardnesses $Mg(HCO_3)_2$ and $MgSO_4$ to form insoluble flocs $\underline{CaCO_3}$ and $\underline{Mg\ (OH)_2}$.

The added lime 55 ($Ca(OH)_2$ or CaO) reacts with the $CO_2$, $Ca(HCO_3)_2$, Mg ($HCO_3)_2$ and $MgSO_4$, also producing insoluble $CaCO_3$ and $\underline{Mg(OH)_2}$. $Na_2CO_3$ produced previously from $Na\overline{OH}$ reactions reacts with permanent hardness $CaSO_4$ producing insoluble $CaCO_3$.

The added ozone 57 ($O_3$) oxidizes $FeSO_4$, organics and $MnSO_4$ producing insoluble $\underline{Fe(OH)_3}$, $\underline{MnO_2}$ and $\underline{AlPO_4}$ in conjunction with other intermediate chemical products.

The added potassium permanganate 75 ($KMnO_4$) is another oxidizing agent suitable for removal of ferrous sulfate $FeSO_4$, resulting insoluble $\underline{Fe(OH)_3}$.

Toxic heavy metals $NiCl_2$, $\overline{NiSO_4}$, $Cr_2(SO_4)_3$, $Cd(NO_3)_2$, $CuSO_4$, $ZnCl_2$, $Pb(NO_3)_2$, $AgNO_3$, etc. in the influent liquid stream 16 can all be precipitated by lime 55 producing their respective insoluble hydroxide flocs $\underline{Ni(OH)_2}$, $\underline{Cr(OH)_3}$, $\underline{Cd(OH)_2}$, $\underline{Cu(OH)_2}$, $\underline{Zn(OH)_2}$, $\underline{Pb(OH)_2}$ and $\underline{Ag(OH)}$. All insoluble chemical flocs further agglomerate with turbidity and color colloids forming bigger insoluble complex flocs.

The micro gas bubbles in said open vessel 63 (FIG. 4) float all insoluble chemical flocs as well as insoluble complex flocs to the water surface in said open vessel 63 and escape as the waste gas 62. The floated scums 61 are removed by skimming/cooping means 113 from the water surface of said open vessel 63. The heavy settled silts 68 are removed periodically by sludge collection mean 101 from the water bottom of said open vessel 63.

The clarified open vessel effluent 66 flows to a stabilization unit 71 where carbon dioxide 59, is dosed for recarbonation, pH adjustment (to 8 to 8.5) and scale prevention. The stabilized effluent 67 flows to a filtration unit 64 and then to a disinfection unit 65 for final polishing before being discharged as the product water 90 which meets the U.S. Federal Drinking Water Standards.

A portion of said product water 90 or the effluent from said filtration 64, or the effluent from said open vessel 63, is recycled by a pump 17 to a pressure vessel 1 through a gas injection loop 18 where ozone 57 is dosed by suction. Air 58 and more ozone 57 are added to said pressure vessel 1 for complete dissolution of all gases in the pressurized water which in turn flows to the pressurized water release assembly 40 for subsequent production of micro gas bubbles (with diameter less than 80 microns) in said open vessel 63, thus completing a cycle.

EXAMPLE 3

Figure 5:
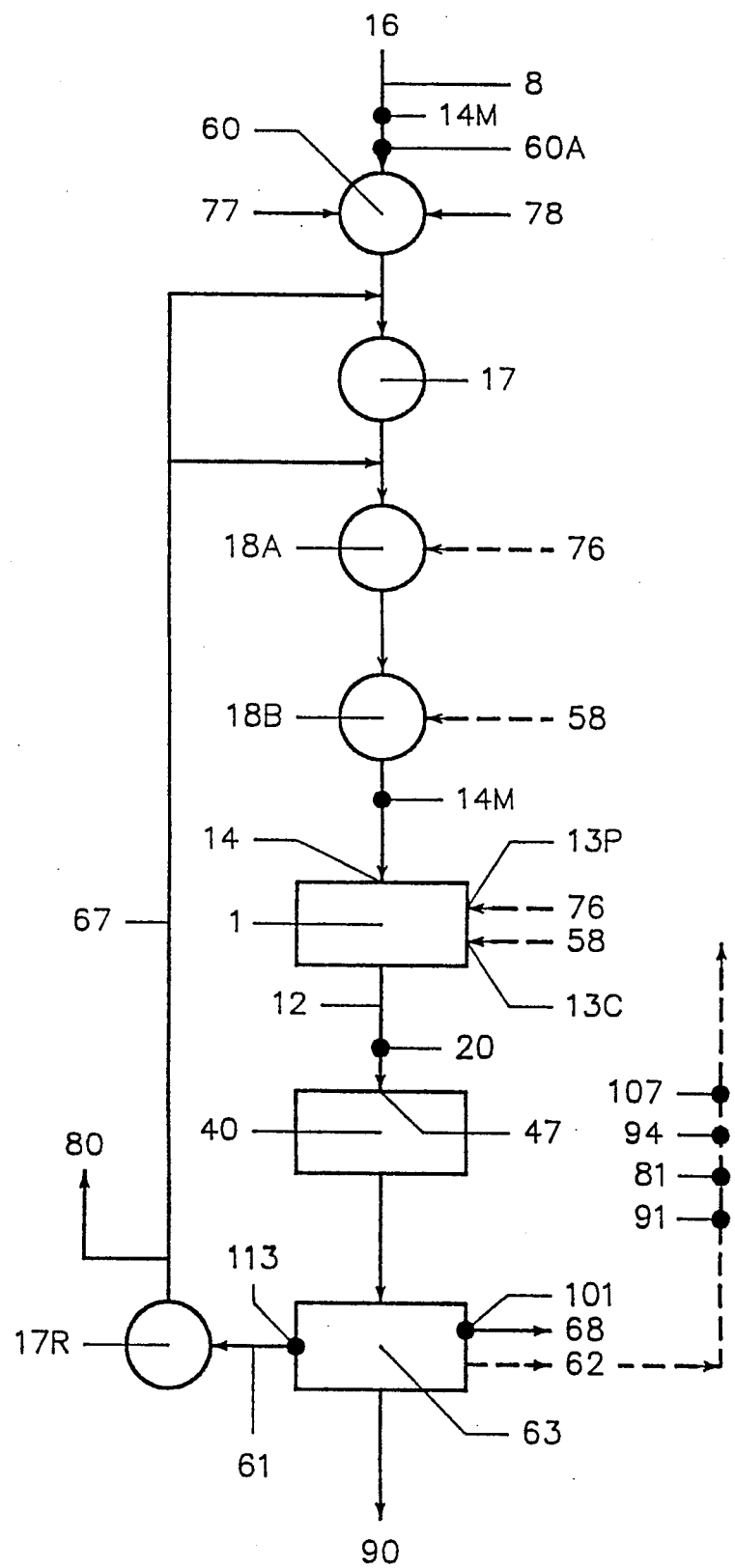
FIG. 5 is the flow diagram of a single-stage biochemical process system described in Example 3.
Figure 6:
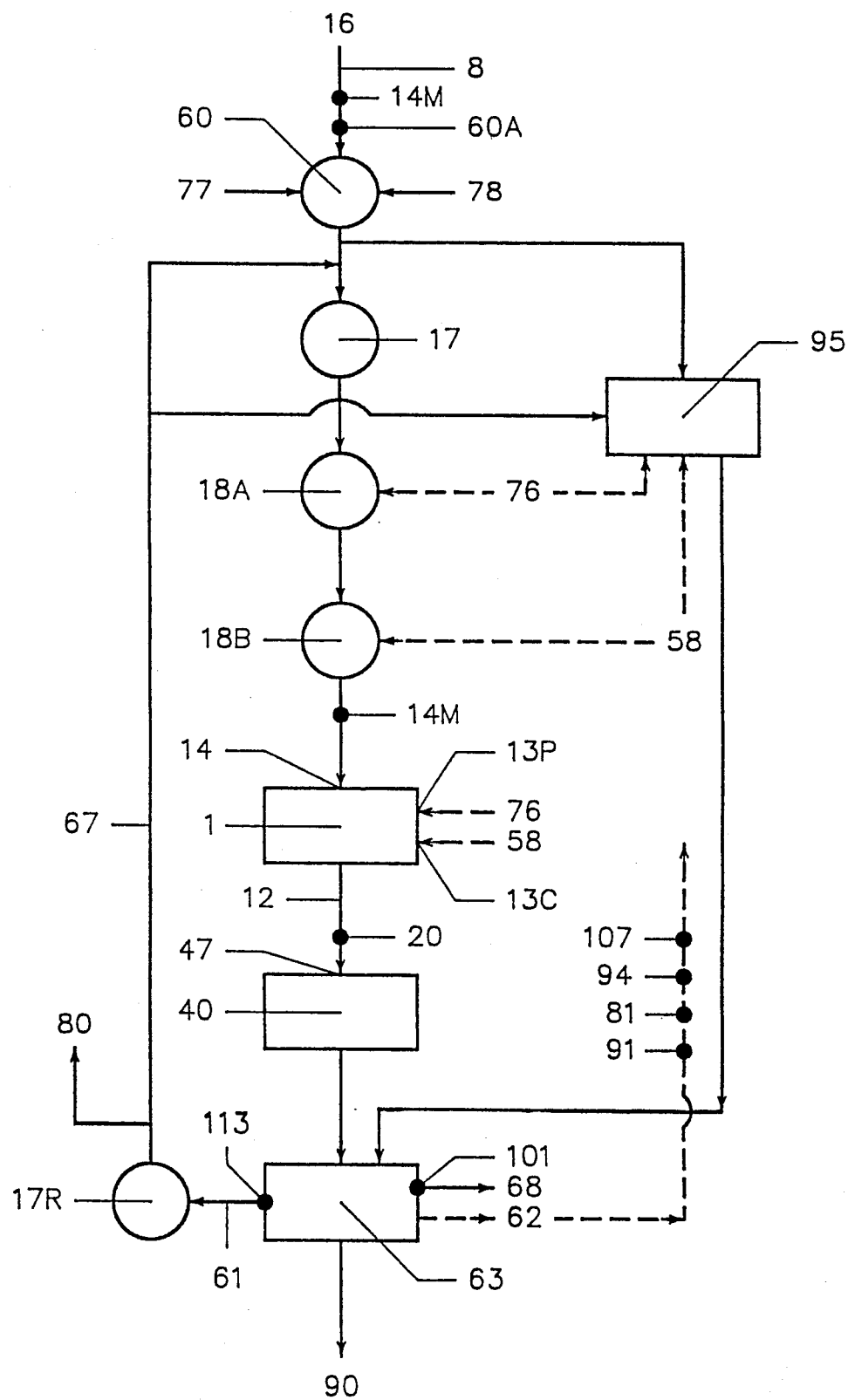
FIG. 6 presents the flow diagram of a dual biochemical process system.

Several batches of primary effluent from New Jersey USA, have been mixed together for treatment by a single-stage biochemical process shown in FIG. 5, and its apparatus is partially shown in FIGS. 1A, 1B, 2A, 2B and 2C and systematically shown in FIG. 5. The compositions of the influent liquid stream 16 are: 2,600,000/100 ml of total coliforms, 750 CU of color, 96 NTU of turbidity, 6.8 units of pH, 130 mg/l of alkalinity as $CaCO_3$, 15 mg/l of ammonia-N, 12.8 mg/l of phosphate-P, 310 mg/l of 5-day BOD, and 320 mg/l of TSS. Over 90% reductions of total coliforms, color, turbidity, phosphate, BOD, and TSS are accomplished consistently after treatment. In operation, the influent liquid stream 16 is fed to a chemical mixing chamber 60 where nutrients 77 and microorganisms 78 required for biochemical reactions are added. The influent liquid stream 16 now containing enough nutrients is pumped by a pump 17 to a pressure vessel 1 to where air 58 and pure oxygen 76 are fed through gas inlets 13C and 13P, respectively. Additional air 58 and pure oxygen 76 are fed to gas injectors 18B and 18A, respectively, before the liquid stream 16 enters said pressure vessel 1 through a nozzle assembly 14. The microorganism concentration in said pressure vessel 1 is maintained at 15,000 to 35,000 mg/l at 80-100 psig of pressure and over 45 mg/l of supersaturated dissolved oxygen (DO).

In accordance with the famous L. K. Wang and D. C. Elmore Equations in below, the higher the pressure (P) inside said pressure vessel 1, the higher the DO concentration in water:

$$DO_{sfn} = 14.53475 - 0.4024407T + 0.834117 \times 10^{-2}T^2 -$$
$$0.1096844 \times 10^{-3}T^3 + 0.6373492 \times 10^{-6}T^4$$

$$DO_{ssn} = DO_{sfn} + CL(-0.1591768 + 0.5374137 \times 10^{-2}T -$$
$$0.1152163 \times 10^{-3}T^2 + 0.1516847 \times 10^{-5}T^3 - 0.8862202 \times$$
$$10^{-8}T^4)$$

$$DO_{ssp} = DO_{ssn}(P - V)/(760 - V)$$

$$V = 4.581148 + 0.3058575T + 0.1954036 \times 10^{-1}T^2 -$$
$$0.7095922 \times 10^{-3}T^3 + 0.3928136 \times 10^{-4}T^4 - 0.5021040 \times$$
$$10^{-6}T^5$$

where:

$DO_{sfn}$ = saturation concentration of DO in fresh water (negligible concentration of chloride) at normal barometric pressure (760 mm Hg), and any water temperature, mg/l.

$DO_{ssn}$ = saturation concentration of DO in either saline or fresh water at normal barometric pressure (760 mm Hg), any water temperature and any chloride concentration, mg/l.

$DO_{ssp}$ = saturation concentration of DO in either saline or fresh water at any barometric pressure, any water temperature and any chloride concentration, mg/l.

T = water temperature, °C.,

CL = chloride concentration in water, g/l,

P = barometric pressure, mm Hg, and

V = pressure of saturated water vapor at the water temperature, mm Hg

As a typical example, when water temperature (T) = 29 degree C, chloride concentration (CL) = 5 g/l, and environmental barometric pressure (P) = 700 mm Hg, dissolved oxygen concentration ($DO_{ssp}$) is only 6.7 mg/l for supporting a conventional activated sludge process system, in which the microorganisms concentration ranges from 1,500 to 5,000 mg/l for bioxidation. However, at 90 psig, (P = 4654.35 mm Hg) inside said pressure vessel 1 of this invention, the super-saturated dissolved oxygen concentration ($DO_{ssp}$) becomes 46.25 mg/l which supports extremely high concentration of microorganisms, in turn, increases the treatment efficiency, and reduces the treatment detention time.

Under such conditions, the organic contaminants $C_aH_bO_cN_dP_eS_f$ are consumed by the microorganisms rapidly in accordance with the following biochemical reactions:

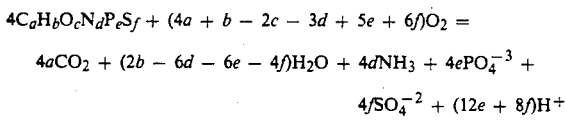

$$4C_aH_bO_cN_dP_eS_f + (4a + b - 2c - 3d + 5e + 6f)O_2 =$$
$$4aCO_2 + (2b - 6d - 6e - 4f)H_2O + 4dNH_3 + 4ePO_4^{-3} +$$
$$4fSO_4^{-2} + (12e + 8f)H^+$$

in which the end product $NH_3$ can be further oxidized to $NO_2-$ and/or $NO_3-$. The micro-organisms grow inside said pressure vessel 1 in accordance with the following two equations approximately:

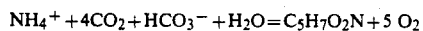

$$NH_4^+ + 4CO_2 + HCO_3^- + H_2O = C_5H_7O_2N + 5O_2$$

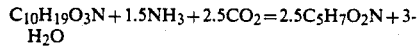

$$C_{10}H_{19}O_3N + 1.5NH_3 + 2.5CO_2 = 2.5C_5H_7O_2N + 3H_2O$$

in which $C_5H_7O_2N$ is the empirical formula of bacteria cell and $C_{10}H_{19}O_3N$ is the empirical composition of domestic sewage.

Some times the DO is sufficient to reach the microorganisms, but there is no external carbonaceous source available for cell assimilation because of low organic loading. Some microorganisms will enter into an "endogenous oxygen respiration" inside said pressure vessel 1:

$$C_5H_7O_2N + 5O_2 = 4CO_2 + NH_4HCO_3 + H_2O$$

$$or = 5CO_2 + NH_3 + 2H_2O$$

After a sufficient detention time inside said pressure vessel 1 is over, domestic sewage $C_{10}H_{19}O_3N$ or any other organic pollutants $C_aH_bO_cN_dP_eS_f$ are consumed by the existing microorganisms in the presence of supersaturated DO, and more microorganisms $C_5H_7O_2N$ and waste gases, such as $Co_2$ and trace of $NH_3$ are produced inside said pressure vessel 1, but in total dissolution forms. The effluent of pressure vessel 1 passes through a pressurized water release assembly 40, entering an open vessel 63 where the insoluble suspended microorganisms $C_5H_7O_2N$ are floated to the water surface by a swarm of micro bubbles (with diameter less than 80 microns) coming from the pressurized water release assembly 40. The floated sludges 61 are removed by skimming/scooping means 113, and pumped away by a pump 17R. A portion of the floated sludge 61 transported by said pump 17R is discharged as waste sludge 80, and the remaining portion of said floated sludge 67 containing mainly microorganisms is recycled back to the pressure vessel 1 ahead of injectors 18A and 18B in order to maintain a constant population of microorganisms for continuous biochemical reactions inside said pressure vessel 1. The waste gas 62 from gas bubbles is discharged to air environment, while a few settled silts 68 is removed by sludge collection means 101 from the bottom of said open vessel 63. The subnatant in said open vessel 63 is the treated wastewater 90 to be discharged.

TABLE 1

WATER PURIFICATION BY TWO-STAGE CHEMICAL-PHYSICAL PROCESS

| Parameters | Influent Characteristics Before Treatment | Effluent Characteristics After Treatment |
|---|---|---|
| Coliforms, #/100 ml | 3 | 0 |
| Color, unit | 5 | 0.5 |
| Turbidity, NTU | 2 | 0.2 |
| pH, unit | 7.2 | 8.0 |
| Hardness - Mg, mg/l as $CaCO_3$ | 42 | 2.5 |
| Hardness - Ca, mg/l as $CaCO_3$ | 175 | 12 |
| Phosphate P, mg/l | 0.5 | 0.4 |
| Fe, mg/l | 0.4 | 0.2 |
| Mn, mg/l | 0.06 | 0.05 |
| $CO_2$, mg/l | 9.8 | 0 |
| Bicarbonate Alkalinity, mg/l as $CaCO_3$ | 120 | 20 |

TABLE 2

WATER PURIFICATION BY SINGLE-STAGE CHEMICAL-PHYSICAL PROCESS

| Parameters | Influent Characteristics Before Treatment | Effluent Characteristics After Treatment |
|---|---|---|
| Coliforms, #/100 ml | 3 | 0 |
| Color, unit | 420 | 4 |
| Turbidity, NTU | 75 | 0.5 |
| pH, unit | 6.7 | 8.0 |
| Hardness, mg/l as $CaCO_3$ | 312 | 28 |
| Phosphate-P, mg/l | 8 | 0.5 |
| Fe, mg/l | 10 | 0.2 |
| Mn, mg/l | 0.9 | 0.01 |
| Ni, mg/l | 3.5 | 0.6 |
| Cr, mg/l | 0.2 | 0.01 |
| Hg, mg/l | 0.002 | 0.002 |
| Cd, mg/l | 0.2 | 0.005 |
| Cu, mg/l | 1.5 | 0.25 |
| Zn, mg/l | 6.1 | 0.5 |
| Pb, mg/l | 1.2 | 0.005 |
| Ag, mg/l | 0.1 | 0.03 |
| Se, mg/l | 0.01 | 0.01 |
| Ba, mg/l | 0.8 | 0.8 |
| As, mg/l | 0.01 | 0.01 |

TABLE 3

WASTEWATER TREATMENT BY BIOCHEMICAL PROCESS

| Parameters | Influent Characteristics Before Treatment | Effluent Characteristics After Treatment |
|---|---|---|
| Coliforms, #/100 ml | 2,600,000 | 10,200 |

TABLE 3-continued

WASTEWATER TREATMENT BY BIOCHEMICAL PROCESS

| Parameters | Influent Characteristics Before Treatment | Effluent Characteristics After Treatment |
|---|---|---|
| Color, unit | 750 | 30 |
| Turbidity, NTU | 96 | 2.8 |
| pH, unit | 6.8 | 7.2 |
| Alkalinity, mg/l as $CaCO_3$ | 130 | NA |
| Ammonia-N, mg/l | 15 | 2 |
| Phosphate-P, mg/l | 12.8 | 0.3 |
| BOD-5 day, mg/l | 310 | 20 |
| TSS, mg/l | 320 | 3 |

Figure 4:
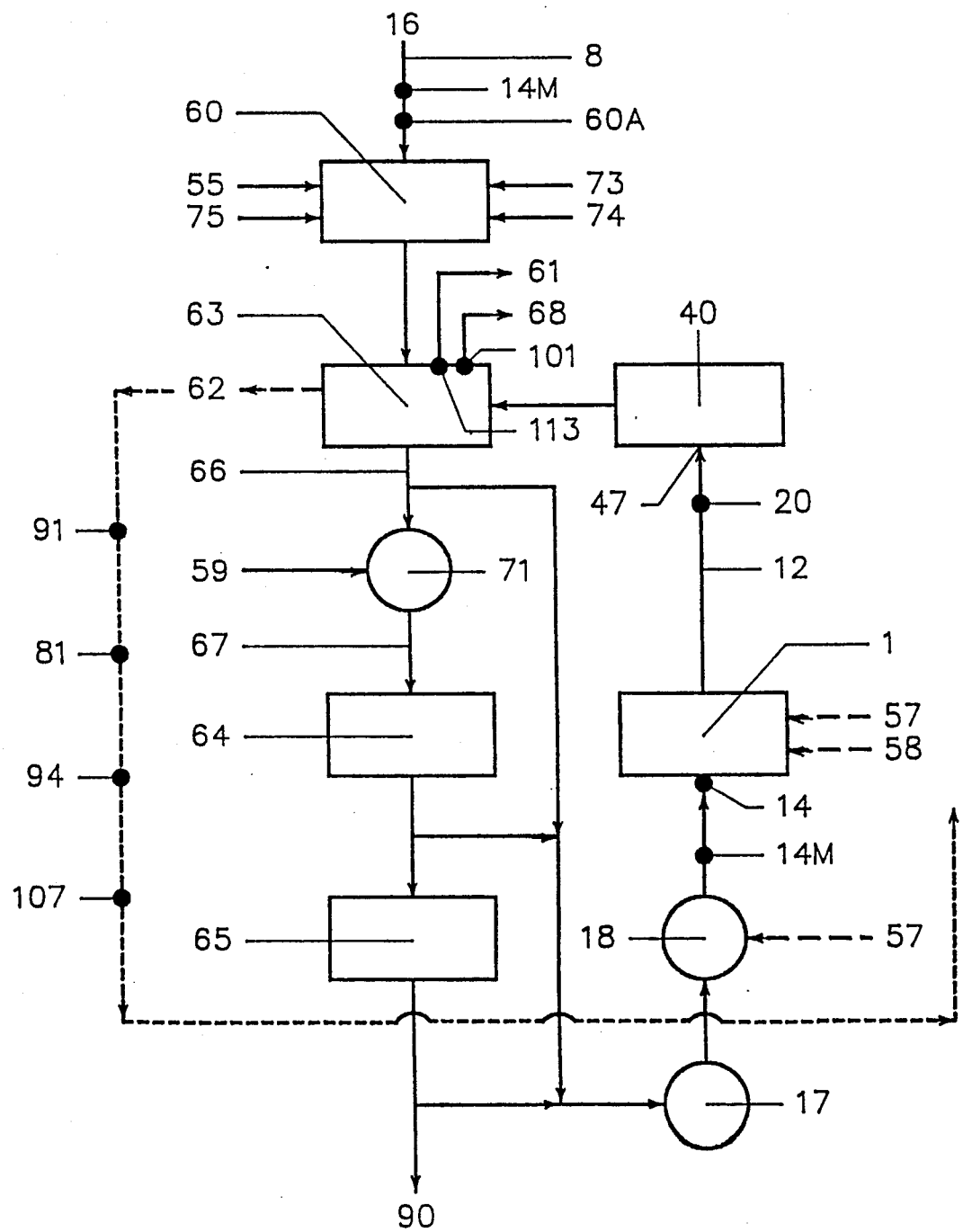
FIG. 4 is the flow diagram of the single-stage chemical-physical process system described in Example 2 for water treatment.

The present invention is specific for compressed and/or uncompressed gaseous solutes to be fed to a liquid solvent inside of a sealed pressure vessel 1 and then dissolved into said liquid solvent at controlled pressure liquid flow rate, gas flow rate, liquid rotation velocity, and detention time. Compressed gas addition is provided by a gas compressor 19 while the uncompressed gas addition is provided by a vacuum gas injector 18 both shown in FIG. 1A. The present invention also relates to an improved pressurized water release assembly 40 shown in FIGS. 2A, 2B, and 2C, that receives the pressurized water from said pressure vessel 1 for uniform pressurized water distribution, pressure reduction and fine bubbles generation, aiming at development of improved chemical-physical process, chemical process and biochemical processes, which apparatus are shown in FIGS. 3, 4 and 5.

There is thus provided by the invention a gas dissolving and releasing method and apparatus which efficiently dissolves gas or gases into a selected liquid stream for improved environmental engineering applications: aeration, oxygenation, chlorination, nitrogenation, recarbonation (carbonation), and ozonation, which involves the use of air, oxygen, chlorine, nitrogen, carbon dioxide, and ozone, respectively. The present invention occupies a relatively small space, does not require adjusting liquid level in said pressure vessel 1, creates no air pollution, and is relatively low in cost. The apparatus is particular suitable for use in generating fine bubbles to separate contaminants by various adsorptive bubble separation processes (such as dissolved air flotation, dispersed air flotation, foam separation, froth flotation, etc.). It is also very suitable for use in the improved aeration systems for bio-oxidation and in the improved ozonation systems for oxidation of iron, manganeses and other reducing impurities. Furthermore, the present invention provides an efficient mean for dissolving carbon dioxide into water for carbonation, recarbonation and hardness removal.

Figure 7:
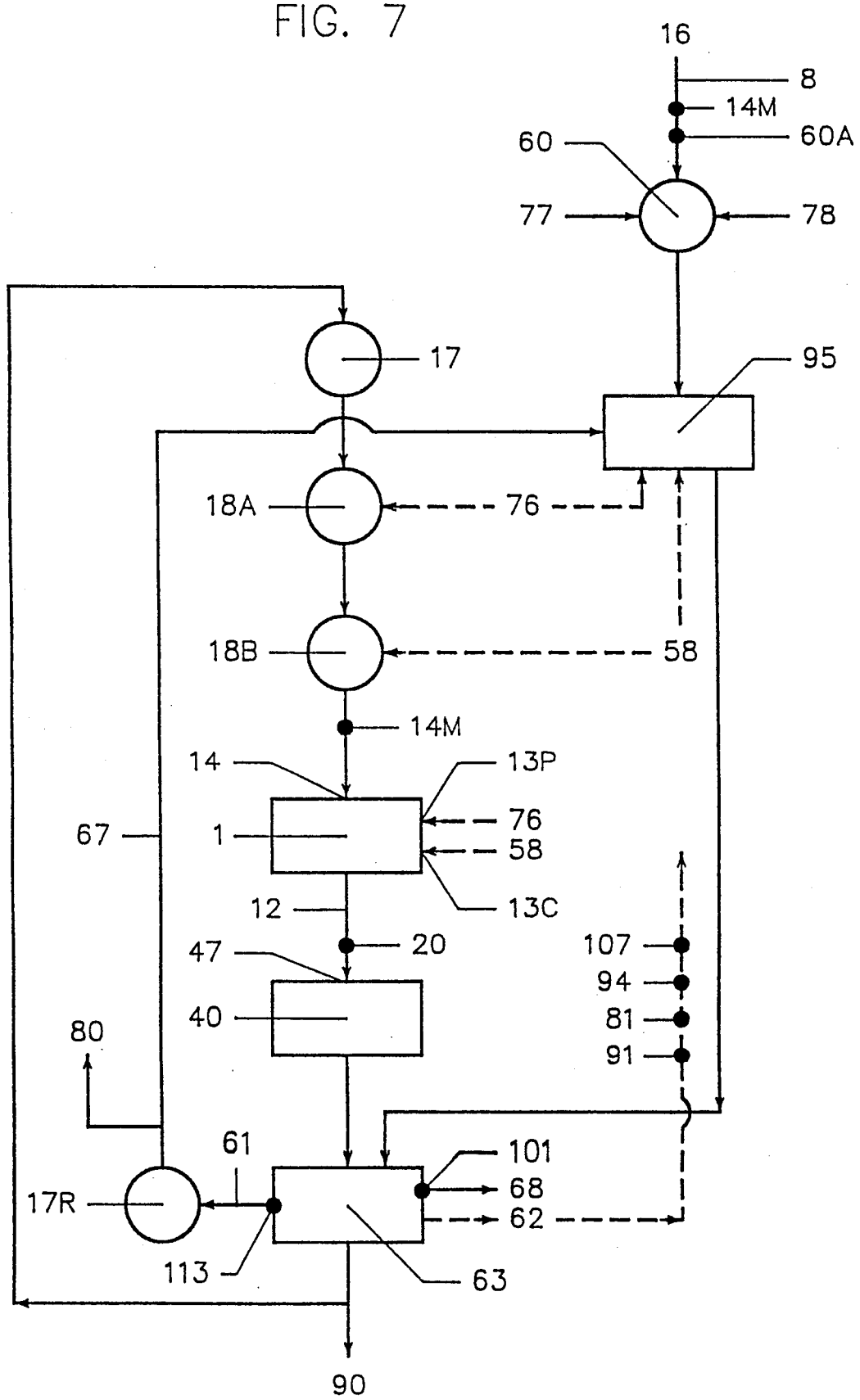
FIG. 7 shows the flow diagram of a low-energy biochemical process system according to the present invention.

It will be understood, however, that the described system may be repiped for filtering and purifying other contaminated or unclarified liquid sources to render the liquid fit for specific applications. The single-stage biochemical process described in Example 3 and illustrated in FIG. 5 can be repiped, forming a dual biochemical process (FIG. 6), or forming a low-energy biochemical process (FIG. 7).

For operation of a dual biochemical process (FIG. 6) in accordance with the present invention, a portion of the pretreated effluent from said chemical mixing chamber 60 flows to a bioreactor 95 for biochemical reactions there, in the presence of oxygen 76 and air 58 supplied to said bioreactor 95. The effluent from said bioreactor 95 flows to the open vessel 63 for further treatment. A portion of the floated scum 67 containing mainly microorganisms is recycled to said bioreactor 95 in order to maintain a constant population of microorganisms in said bioreactor 95. The remaining process operation of said dual biochemical process (FIG. 6) is identical to that of a single-stage biochemical process (FIG. 5; Example 3).

For operation of a low-energy biochemical process (FIG. 7) in accordance with the present invention, all pretreated effluent from said chemical mixing chamber 60 flows to a bioreactor 95 for biochemical reactions there, in the presence of oxygen 76 and air 58 supplied to said bioreactor 5. The effluent from said bioreactor 95 flows to the open vessel 63 for further treatment. A portion of the floated scum 67 containing mainly microorganisms is recycled to said bioreactor 95 in order to maintain a constant population of microorganisms in said bioreactor 95. A portion of final effluent 90 is recycled by the pump 17 to the gas dissolving units including: gas injectors 18A and 18B, pressure vessel 1, pressurized water release assembly 40, and open vessel 63. The remaining process operation of said low energy biochemical process (FIG. 7) is identical to that of a single-stage biochemical process (FIG. 5; Example 3).

Referring to FIGS. 3, 4, 5, 6, and 7 various liquid streams or combinations thereof can be pressurized by said pump 17, and discharged to said pressure vessel 1 through a gas injector 18. The effluent of pressure vessel 1 is depressurized in stages in a subsequent said pressurized water release assembly 40. At least one open vessel 63 can be used to receive said influent liquid stream 16 with or without chemicals/microorganisms, to hold the depressurized liquid containing micro gas bubbles, and to separate the subnatant and the floated scum. Sludge removal means 101 are used for collection of floated scum and settled sludge periodically or continuously. A vacuum pump or a gas mover 81, a granular activated carbon filter 94 and an enclosure 91 over the top of said open vessel 63 are used for collection and purification of waste gases from said open vessel 63. The means for collection and purification of waste gases are removable for inspection or repairs.

For the best mode of operation and accommodation of said pressurized water release assembly 40, the sludge of said open vessel 63 is of rectangular or square in shape. However, circular open vessel are equally effective.

A liquid flow measuring means 14M showing in FIGS. 3, 4, 5, 6 and 7 which can be a liquid flow meter, a liquid nozzle assembly 1 4, a venturi meter, or combinations thereof for controlling flow rate of a liquid entering said pressure vessel 1.

The high liquid rotation velocity over 2,500 rpm inside said pressure vessel 1 is created by a liquid nozzle assembly 14, a porous center gas dissolving tube 2, and a recirculation pump 17.

As shown in FIGS. 3-7, the inlet pipe 8 is directly or indirectly connected to a chemical mixing chamber 60 where chemicals and/or microorganisms are dosed for various liquid treatment applications. When the influent liquid stream 16 is heavily contaminated by oil, an oil-water separator 60A is connected to said inlet pipe 8 for oil-water separation in addition to the liquid treatment by the gas dissolving and releasing system of this invention.

While the present invention has been described with reference particular embodiments thereof, it will be understood that numerous other minor modifications may be made by those skilled in the art without departing from the scope of the invention. Therefore, the following claims are intended to cover all such equivalent variations as come within the true spirit and scope of the invention.

What is claimed is:

1. A single-stage apparatus for dissolving a plurality of gases into a pressurized liquid stream by pressurization, releasing the pressurized liquid stream containing said dissolved gases to a reduced pressure, generating micro gas bubbles in the depressurized liquid stream, discharging said depressurized liquid stream and purifying the escaped gases comprising:

(a) an inlet pipe means, an inlet nozzle assembly means connected to the inlet pipe means, influent liquid stream flow measuring means connected to the inlet pipe means for measuring the influent liquid stream flow, gas injector means connected to said inlet pipe means for feeding a first gas into said influent liquid stream, pump means connected to said inlet pipe means for forcing said influent liquid stream through said gas injector means, said liquid flow measuring means, and said nozzle assembly means;

(b) an enclosed cylindrical pressure vessel means having a tangentially disposed liquid stream vessel inlet means connected to said inlet pipe means for delivering said influent liquid stream into said cylindrical pressure vessel means, said pump means, said nozzle assembly means and said inlet pipe means cooperating to feed the influent liquid stream under conditions to yield a rotating influent liquid stream inside said pressure vessel means which rotates at over 2500 rpm; and said pressure vessel means further comprising a pressure gauge, a safety valve, gas bleed off valve means, plural gas inlet means for feeding at least a second and third gases into said pressure vessel means, support legs attached to the outside wall of said pressure vessel means for supporting the pressure vessel means, gas flow meter means and regulator means connected to the plural gas inlet means for regulating the pressure in said pressure vessel means to 2-7 atmospheres, and a vessel outlet means;

(c) a pressurized water release assembly means having an assembly inlet means connected to the vessel outlet means of said pressure vessel; said pressurized water release assembly means further comprising a pressure reduction valve, a horizontal pressurized water distribution pipe connected to said assembly inlet means having small holes on top, said pressurized water release assembly means further including a half circular hood mounted above said distribution pipe and means defining a channel for allowing said influent liquid stream to be depressurized in stages under laminar flow conditions for generation of micro gas bubbles with diameter less than 80 microns in the depressurized liquid stream;

(d) mixing means directly or indirectly connected to said inlet pipe means for mixing chemicals and/or microorganisms into said influent liquid stream and producing a mixed liquid stream; and (e) an open vessel means connected to said mixing means for receiving the mixed liquid stream from the mixing means and the depressurized liquid stream from the water release assembly means and holding the depressurized liquid stream containing said micro gas bubbles sufficiently long so that a floating scum layer forms on the free surface of the liquid and a subnatant forms below the floating scum; discharge means to discharge said subnatant as a clarified effluent liquid stream, means for recycling a portion of said effluent from the discharge means of said open vessel means to the pressure vessel means, sludge removal means for collection of said floating scum, gas collection and purification means positioned over the top of the open vessel means to receive and purify gas escaping from said open vessel means, said gas collection and purification means further comprising a vacuum pump, a granular activated carbon filter and an enclosure over said open vessel means.

2. The apparatus of claim 1 wherein said liquid stream flow measuring means is a liquid flow meter, a venturi meter, a nozzle assembly, or combinations thereof.

3. The apparatus of claim 1 wherein said over 2,500 rpm of liquid rotation velocity is created by a nozzle assembly, a tangentially disposed liquid stream vessel inlet means, a porous center gas dissolving tube, a recirculation pump, or combinations thereof.

4. The apparatus of claim 1 wherein said open vessel means is circular, rectangular or square in shape.

5. The apparatus of claim 1 wherein said gas collection and purification means is removable.

6. The apparatus of claim 1 wherein said inlet pipe means is connected to an oil-water separator where free oil is separated from said influent liquid stream.

7. The apparatus of claim 1 wherein said discharge means of said open vessel means is connected to a stabilization means and/or filtration means for further treating said clarified effluent liquid stream from said open vessel means.

8. A two-stage apparatus for dissolving a plurality of gases into a pressurized liquid stream by pressurization, releasing the pressurized liquid stream containing said dissolved gases to a reduced pressure, generating micro gas bubbles in the depressurized liquid stream, purifying the escaped gases, and stabilizing, filtering, disinfecting, and discharging the depressurized liquid stream comprising;

(a) an inlet pipe means, an inlet nozzle assembly means connected to said inlet pipe means, influent liquid stream flow measuring means connected to the inlet pipe means for measuring an influent liquid stream flow, gas injector means connected to said inlet pipe means for feeding a first gas into said influent liquid stream, pump means connected to said inlet pipe means for forcing said influent liquid stream through said gas injector means, said liquid flow measuring means, and said nozzle assembly means;

(b) an enclosed cylindrical pressure vessel means having a tangentially disposed liquid stream vessel inlet means connected to said inlet pipe means for delivering said influent liquid stream into said cylindrical pressure vessel means, said pump means, said nozzle assembly means and said inlet pipe means cooperating to feed the influent liquid stream under conditions to yield a rotating influent liquid stream inside said pressure vessel means which rotates at over 2500 rpm; and said pressure vessel means further comprising a pressure gauge, a safety valve, gas bleed off valve means, plural gas inlet means for feeding at least a second and third gases into said pressure vessel means, support legs attached to the outside wall of said pressure vessel means for supporting the pressure vessel means, gas flow meter means and regulator means connected to the plural gas inlet means for regulating the pressure in said pressure vessel means to 2-7 atmospheres, and a vessel outlet means;

(c) a pressurized water release assembly means having an assembly inlet means connected to the vessel outlet means of said pressure vessel; said pressurized water release assembly means further comprising a pressure reduction valve, a horizontal pressurized water distribution pipe connected to said assembly inlet means having small holes on top, said pressurized water release assembly means further including a half circular hood mounted above said distribution pipe and means defining a channel for allowing said influent liquid stream to be depressurized in stages under laminar flow conditions for generation of micro gas bubbles with diameter less than 80 microns in the depressurized liquid stream;

(d) mixing means directly or indirectly connected to said inlet pipe means for mixing chemicals into said influent liquid stream and producing a mixed liquid stream;

(e) an open vessel means connected to said mixing means for receiving the mixed liquid stream from the mixing means and the depressurized liquid stream from the pressurized water release assembly means and holding the depressurized liquid stream containing said micro gas bubbles sufficiently long so that a floating scum layer forms on the free surface of the liquid and a subnatant forms below the floating scum; discharge means to discharge said subnatant as a clarified effluent liquid stream, means for recycling a portion of said effluent from the discharge means of said open vessel means to the pressure vessel means, sludge removal means for collection of said floating scum, gas collection and purification means positioned over the top of the open vessel means to receive and purify gas escaping from said open vessel means, said gas collection and purification means further comprising a vacuum pump, a granular activated carbon filter and an enclosure over said open vessel means;

(f) a stabilization means comprising carbon dioxide feeding means, connected to said open vessel means for stabilizing and recarbonating said clarified effluent liquid stream, and producing the first liquid effluent stream;

(g) the second inlet pipe means connected to a second inlet nozzle assembly means, the second influent liquid stream flow measuring means connected tot he second inlet pipe means for measuring the second influent liquid stream flow (i.e. the first liquid effluent stream flow), the second mixing means directly or indirectly connected to said second inlet pipe means for mixing chemicals and/or microorganisms into said second influent liquid stream, the second gas injector means connected to said second inlet pipe means for feeding a fourth gas into said second influent liquid stream, second pump means connected to said second inlet pipe means for forcing said second influent liquid stream through said second gas injector means, said second liquid flow measuring means, and said second nozzle assembly means;

(h) a second enclosed cylindrical pressure vessel means having a tangentially disposed second influent liquid stream vessel inlet means connected to said second inlet pipe means for delivering said second influent liquid stream into said second cylindrical pressure vessel means, said second pump means, second nozzle assembly means and second inlet pipe means cooperating to feed the second influent liquid stream under conditions to yield a rotating influent liquid stream inside said second pressure vessel means which rotates at over 2500 rpm; and said second pressure vessel means further comprising a second pressure gauge, a second safety valve, second gas bleed off valve means, second plural gas inlet means for feeding at least a fifth and sixth gases into said second pressure vessel means, second support legs attached to the outside wall of said second pressure vessel means for supporting the second pressure vessel means, second gas flow meter means and second regulator means connected to the second plural gas inlet means for regulating the pressure in said second pressure vessel means to 2-7 atmospheres, and a second vessel outlet means;

(i) a second pressurized water release assembly means having a second inlet means connected to the second vessel outlet means; said second pressurized water release assembly means further comprising a second pressure reduction valve, a second horizontal pressurized water distribution pipe connected to said second assembly inlet means having small holes on top, said second pressurized water release assembly means further including a second half circular hood mounted above said second distribution pipe and second means defining a channel for allowing said second influent liquid stream to be depressurized in stages under laminar flow conditions for generation of micro gas bubbles with diameter less than 80 microns in the depressurized second liquid stream;

(j) a second open vessel means connected to said second mixing means for receiving the depressurized second liquid stream form the second pressurized water release assembly means and holding the second influent liquid stream containing said micro gas bubbles sufficiently long so that a floating scum layer forms on the free surface of the liquid and a subnatant forms below the floating scum; second discharge means to discharge said subnatant as a second clarified effluent liquid stream, a second means for recycling a portion of said effluent from the second discharge means of said second open vessel means to the second pressure vessel means, second sludge removal means for collection of said floating scum, a second gas collection and purification means positioned over the top of the second open vessel means to receive and purify gas escaping from said second open vessel means, said second gas collection and purification means further comprising a second vacuum pump, a second granular activated carbon filter and a second enclosure over said second open vessel means;

(k) a second stabilization means comprising a second carbon dioxide feeding means, connected to said second open vessel means for stabilizing and recarbonating said second clarified effluent liquid stream and producing a stabilized effluent liquid stream;

(l) a filtration means connected to said second stabilization means for filtering said stabilized effluent liquid stream, and producing a filtered effluent liquid stream; and (m) a disinfection means connected to said filtration means for disinfecting said filtered effluent liquid stream, and producing a final effluent liquid stream.

9. An apparatus for dissolving a plurality of gases into a pressurized liquid stream by pressurization, releasing the pressurized liquid stream containing said dissolved gases to a reduced pressure, generating micro gas bubbles in the depressurized liquid stream, purifying the escaped gases, and stabilizing, filtering, disinfecting, and discharging the depressurized liquid stream comprising:

(a) an influent pipe means, and an influent liquid stream flow measuring means connected to the influent pipe means for measuring the influent liquid stream flow;

(b) mixing means directly or indirectly connected to said influent pipe means for mixing chemicals into said influent liquid stream and producing a mixed liquid stream;

(c) an inlet pipe means connected to an inlet nozzle assembly means, recycled liquid stream flow measuring means connected to the inlet pipe means for measuring recycled liquid stream flow, gas injector means connected to said inlet pipe means for feeding a first gas into said recycled liquid stream, pump means connected to said inlet pipe means for forcing said recycled liquid stream through said gas injector means, said recycled liquid flow measuring means, and said nozzle assembly means;

(d) an enclosed cylindrical pressure vessel means having a tangentially disposed liquid stream vessel inlet means connected to said inlet pipe means for delivering said recycled liquid stream into said cylindrical pressure vessel means, said pump means, said nozzle assembly means and said inlet pipe means cooperating to feed the recycled liquid stream under conditions to yield a rotating liquid stream inside said pressure vessel means which rotates at over 2500 rpm; and said pressure vessel means further comprising a pressure gauge, a safety valve, gas bleed off valve means, plural gas inlet means for feeding at least a second and third gases into said pressure vessel means, support legs attached to the outside wall of said pressure vessel means for supporting the pressure vessel means, gas flow meter means and regulator means connected to the plural gas inlet means for regulating the pressure in said pressure vessel means to 2-7 atmospheres, and a vessel outlet means;

(e) a pressurized water release assembly means having an assembly inlet means connected to the vessel outlet means of said pressure vessel means; said pressurized water release assembly means further comprising a pressure reduction valve, a horizontal pressurized water distribution pipe connected to said assembly inlet means having small holes on top, said pressurized water release assembly means further including a half circular hood mounted above said distribution pipe and means defining a channel for allowing said influent liquid stream to be depressurized in stages under laminar flow conditions for generation of micro gas bubbles with diameter less than 80 microns in the depressurized liquid stream;

(f) an open vessel means connected to said mixing means for receiving both the mixed liquid stream from said mixing means and the depressurized liquid stream from the pressurized water release assembly means and holding said depressurized liquid stream containing said micro gas bubbles sufficiently long so that a floating scum layer forms on the free surface of the liquid and a subnatant forms below the floating scum; discharge means to discharge said subnatant as a clarified effluent liquid stream, means for recycling a portion of said effluent from the discharge means of said open vessel means to the pressure vessel means and producing a recycled liquid stream, sludge removal means for collection of said floating scum, gas collection and purification means positioned over the top of the open vessel means to receive and purify gas escaping from said open vessel means, said gas collection and purification means further comprising a vacuum pump, a granular activated carbon filter and an enclosure over said open vessel means;

(g) a stabilization means comprising a carbon dioxide feeding means, connected to said open vessel means for stabilizing and recarbonating said clarified effluent liquid stream, and producing a stabilized effluent liquid stream;

(h) a filtration means connected to said stabilization means for filtering said stabilized effluent liquid stream, and producing a filtered effluent liquid stream; and (i) a disinfection means connected to said filtration means for disinfecting said filtered effluent liquid stream, and producing a final effluent liquid stream.

10. A single-stage apparatus for dissolving a plurality of gases into a pressurized liquid stream by pressurization, releasing the pressurized liquid stream containing said dissolved gases and microorganisms to a reduced pressure, generating micro gas bubbles in the depressurized liquid stream, purifying the escaped gases, concentrating microorganisms as floating scum on the surface of said depressurized liquid stream, recycling a portion of said concentrated microorganisms in floating scum to said pressurized liquid stream for biochemical reactions, and discharging said depressurized liquid stream comprising:

(a) an influent pipe means, and an influent liquid stream flow measuring means connected to the influent pipe means for measuring the influent liquid stream flow;

(b) mixing means directly or indirectly connected to said influent pipe means for mixing chemicals and/or microorganisms into said influent liquid stream, and producing a mixed liquid stream;

(c) an inlet pipe means comprising an inlet nozzle assembly means, mixed liquid stream flow measuring means connected to the inlet pipe means for measuring the mixed liquid stream flow, gas injector means connected to said inlet pipe means for feeding a first gas into said mixed liquid stream, pump means connected to said inlet pipe means for forcing said mixed liquid stream through said gas injector means, said mixed liquid flow measuring means;

(d) an enclosed cylindrical pressure vessel means having a tangentially disposed liquid stream vessel inlet means connected to said inlet pipe means for delivering said mixed liquid stream into said cylindrical pressure vessel means, said pump means, said nozzle assembly means and said inlet pipe means cooperating to feed the mixed liquid stream under conditions to yield a rotating liquid stream inside said pressure vessel means which rotates at over 2500 rpm; and said pressure vessel means further comprising a pressure gauge, a safety valve, gas bleed off valve means, plural gas inlet means for feeding at least a second and third gases into said pressure vessel means, support legs attached to the outside wall of said pressure vessel means for supporting the pressure vessel means, gas flow meter means and regulator means connected to the plural gas inlet means for regulating the pressure in said pressure vessel means to 2–7 atmospheres, and a vessel outlet means;

(e) a pressurized water release assembly means having an assembly inlet means connected to the vessel outlet means of said pressure vessel means; said pressurized water release assembly means further comprising a pressure reduction valve, a horizontal pressurized water distribution pipe connected to said assembly inlet means having small holes on top, said pressurized water release assembly means further including a half circular hood mounted above said distribution pipe and means defining a channel for allowing said influent liquid stream to be depressurized in stages under laminar flow conditions for generation of micro gas bubbles with diameter less than 80 microns in the depressurized liquid stream;

(f) an open vessel means connected to said mixing means for receiving both the mixed liquid stream from the mixing means and the depressurized liquid stream from the pressurized water release assembly means and holding said depressurized liquid stream containing said micro gas bubbles sufficiently long so that a floating scum layer forms on the free surface of the liquid and a subnatant forms below the floating scum; discharge means to discharge said subnatant as a clarified effluent liquid stream, sludge removal means for collection of said floating scum, gas collection and purification means positioned over the top of the open vessel means to receive and purify gas escaping from said open vessel means, said gas collection and purification means further comprising a vacuum pump, a granular activated carbon filter and an enclosure over said open vessel means; and (g) means connected to said open vessel means for recycling a portion of said floating scum containing microorganisms from said sludge removal means of said open vessel means to the pressure vessel means for biochemical reactions.

11. A dual apparatus for dissolving a plurality of gases into a pressurized liquid stream by pressurization, releasing the pressurized liquid stream containing said dissolved gases and microorganisms to a reduced pressure, generating micro gas bubbles in the depressurized liquid stream, purifying the escaped gases, concentrating microorganisms as floating scum on the surface of said depressurized liquid stream, recycling a portion of said concentrated microorganisms in floating scum to said pressurized liquid stream for biochemical reactions, treating another portion of said liquid stream under normal one atmospheric pressure biochemically, and recycling a portion of said concentrated microorganisms in floating scum to said liquid stream under normal one atmospheric pressure comprising:

(a) an influent pipe means, and an influent liquid stream flow measuring means connected to the influent pipe means for measuring the influent liquid stream flow;

(b) mixing means directly or indirectly connected to said influent pipe means for mixing chemicals and/or microorganisms into said influent liquid stream, and producing a mixed liquid stream;

(c) bioreactor means connected to said mixing means for treating a portion of said mixed liquid stream in the presence of microorganisms, oxygen, and air under normal one atmospheric pressure and producing the biochemically treated liquid stream;

(d) an inlet pipe means connected to an inlet nozzle assembly means, mixed liquid stream flow measuring means connected to the inlet pipe means for measuring the remaining portion of the mixed liquid stream flow, gas injector means connected to said inlet pipe means for feeding a first gas into said mixed liquid stream, pump means connected to said inlet pipe means for forcing said mixed liquid stream through said gas injector means, said liquid flow measuring means, and said nozzle assembly means;

(e) an enclosed cylindrical pressure vessel means having a tangentially disposed liquid stream vessel inlet means connected to said inlet pipe means for delivering said mixed liquid stream into said cylindrical pressure vessel means, said pump means, said nozzle assembly means and said inlet pipe means cooperating to feed the mixed liquid stream under conditions to yield a rotating liquid stream inside said pressure vessel means which rotates at over 2500 rpm; and said pressure vessel means further comprising a pressure gauge, a safety valve, gas bleed off valve means, plural gas inlet means for feeding at least a second and third gases into said pressure vessel means, support legs attached to the outside wall of said pressure vessel means for supporting the pressure vessel means, gas flow meter means and regulator means connected to the plural gas inlet means for regulating the pressure in said pressure vessel means to 2–7 atmospheres, and a vessel outlet means;

(f) a pressurized water release assembly means having an assembly inlet means connected to the vessel outlet means of said pressure vessel means; said pressurized water release assembly means further comprising a pressure reduction valve, a horizontal pressurized water distribution pipe connected to said assembly inlet means having small holes on top, said assembly means further including a half circular hood mounted above said distribution pipe and means defining a channel for allowing said influent liquid stream to be depressurized in stages under laminar flow conditions for generation of micro gas bubbles with diameter less than 80 microns in the depressurized liquid stream; and (g) an open vessel means connected to said bioreactor means for receiving both the biochemically treated liquid stream from said bioreactor means and the depressurized liquid stream from the pressurized water release assembly means and holding the depressurized liquid stream containing said micro gas bubbles sufficiently long so that a floating scum layer forms on the free surface of the liquid and a subnatant forms below the floating scum; discharge means to discharge said subnatant as a clarified effluent liquid stream, means for recycling a portion of said floating scum from the discharge means of said open vessel means to the pressure vessel means and the bioreactor means, sludge removal means for collection of said floating scum, gas collection and purification means positioned over the top of the open vessel means to receive and purify gas escaping from said open vessel means, said gas collection and purification means further comprising a vacuum pump, a granular activated carbon filter and an enclosure over said open vessel means.

12. A low-energy apparatus for dissolving a plurality of gases into a pressurized liquid stream by pressurization, releasing the pressurized liquid stream containing said dissolved gases to a reduced pressure, generating micro gas bubbles in the depressurized liquid stream, purifying the escaped gases, concentrating microorganisms as floating scum on the surface of said depressurized liquid stream, recycling a portion of said concentrated microorganisms in floating scum to said liquid stream for biochemical reactions under normal one atmospheric pressure, and discharging the depressurized liquid steam comprising:

(a) an influent pipe means, and an influent liquid stream flow measuring means connected to the influent pipe means for measuring the influent liquid stream flow;

(b) mixing means directly or indirectly connected to said influent pipe means for mixing chemicals and/or microorganisms into said influent liquid stream, and producing the mixed liquid stream;

(c) bioreactor means connected to said mixing means for treating said mixed liquid stream in the presence of microorganisms, oxygen and air under normal one atmospheric pressure and producing the biochemically treated liquid stream;

(d) an inlet pipe means connected to an inlet nozzle assembly means, recycled liquid stream flow measuring means connected to the inlet pipe means for measuring recycled liquid stream flow, gas injector means connected to said inlet pipe means for feeding a first gas into said recycled liquid stream, pump means connected to said inlet pipe means for forcing said recycled liquid stream through said gas injector means, said liquid flow measuring means, and said nozzle assembly means;

(e) an enclosed cylindrical pressure vessel means having a tangentially disposed liquid stream vessel inlet means connected to said inlet pipe means for delivering said recycled liquid stream into said cylindrical pressure vessel means, said pump means, said nozzle assembly means and said inlet pipe means cooperating to feed the recycled liquid stream under conditions to yield a rotating liquid stream inside said pressure vessel means which rotates at over 2500 rpm; and said pressure vessel means further comprising a pressure gauge, a safety valve, gas bleed off valve means, plural gas inlet means for feeding at least a second and third gases into said pressure vessel means, support legs attached to the outside wall of said pressure vessel means for supporting the pressure vessel means, gas flow meter means and regulator means connected to the plural gas inlet means for regulating the pressure in said pressure vessel means to 2-7 atmospheres, and a vessel outlet means;

(f) a pressurized water release assembly means having an assembly inlet means connected to the vessel outlet means of said pressure vessel means; said pressurized water release assembly means further comprising a pressure reduction valve, a horizontal pressurized water distribution pipe connected to said assembly inlet means having small holes on top, said pressurized water release assembly means further including a half circular hood mounted above said distribution pipe and means defining a channel for allowing said influent liquid stream to be depressurized in stages under laminar flow conditions for generation of micro gas bubbles with diameter less than 80 microns in the depressurized liquid stream;

(g) an open vessel means connected to said bioreactor means for receiving both the biochemically treated liquid stream from the bioreactor means and the depressurized liquid stream form the pressurized water release assembly means and holding the depressurized liquid stream containing said micro gas bubbles sufficiently long so that a floating scum layer forms on the free surface of the liquid and a subnatant forms below the floating scum; discharge means to discharge said subnatant as a clarified effluent liquid stream, means for recycling a portion of said effluent from the discharge means of said open vessel means to the pressure vessel means and producing a recycled liquid stream, sludge removal means for collection of said floating scum, gas collection and purification means positioned over the top of the open vessel means to receive and purify gas escaping from said open vessel means, said gas collection and purification means further comprising a vacuum pump, a granular activated carbon filter and an enclosure over said open vessel means; and (h) means connected to said open vessel means for recycling a portion of said floating scum containing microorganisms to said mixed liquid stream in said bioreactor means.

* * * * *